(12) United States Patent
Yamazaki et al.

(10) Patent No.: US 8,891,051 B2
(45) Date of Patent: Nov. 18, 2014

(54) BACKLIGHT AND DISPLAY DEVICE

(75) Inventors: Shunpei Yamazaki, Tokyo (JP); Yoshiharu Hirakata, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 13/280,019

(22) Filed: Oct. 24, 2011

(65) Prior Publication Data
US 2012/0099049 A1    Apr. 26, 2012

(30) Foreign Application Priority Data
Oct. 25, 2010    (JP) .................. 2010-239059

(51) Int. Cl.
*G02F 1/1345* (2006.01)
*G02F 1/1335* (2006.01)
*H01J 1/62* (2006.01)
*G02F 1/1343* (2006.01)
*G02F 1/1362* (2006.01)

(52) U.S. Cl.
CPC .......... *G02F 1/133603* (2013.01); *G02F 2001/133612* (2013.01); *G02F 1/134336* (2013.01); *G02F 2001/133622* (2013.01); *G02F 2001/133601* (2013.01); *G02F 2001/133607* (2013.01); *G02F 1/136213* (2013.01)
USPC .............. 349/149; 349/61; 349/62; 349/64; 349/150; 313/506; 313/509

(58) Field of Classification Search
CPC ............ H01L 27/3276; H01L 27/3288; H01L 27/3297; G02B 6/0083; G02F 1/13452; H05K 1/147; H05K 1/189; H05K 1/028; H05K 3/361
USPC .............. 349/61–67, 149–152; 313/509, 506, 313/512, 518, 479, 489; 345/104, 90
See application file for complete search history.

(56) References Cited

U.S. PATENT DOCUMENTS

| | | | |
|---|---|---|---|
| 6,583,915 B1 | 6/2003 | Hong et al. | |
| 7,416,977 B2 * | 8/2008 | Fukuchi et al. | 438/669 |
| 7,808,009 B2 | 10/2010 | Hirakata et al. | |
| 7,985,677 B2 * | 7/2011 | Fujii et al. | 438/638 |
| 2004/0169786 A1 | 9/2004 | Yamazaki et al. | |
| 2007/0228390 A1 * | 10/2007 | Hattori et al. | 257/79 |

(Continued)

FOREIGN PATENT DOCUMENTS

| | | |
|---|---|---|
| JP | 8-262438 | 10/1996 |
| JP | 2004-240412 | 8/2004 |

*Primary Examiner* — Michael Caley
*Assistant Examiner* — Jia Pan
(74) *Attorney, Agent, or Firm* — Husch Blackwell LLP

(57) ABSTRACT

A backlight of which power consumption can be reduced is provided. Further, by effective use of light emitted from the backlight, a display device with low power consumption is provided. The display device includes a light source device in which a plurality of light-emitting elements are arranged, a diffusion plate which is bonded to the light source device, a first polarizing plate which is bonded to the diffusion plate, a liquid crystal panel which is bonded to the first polarizing plate, and a second polarizing plate which is bonded to the liquid crystal panel. The light source device includes an organic resin having a projected spherical surface and a light-transmitting property covering each of the plurality of light-emitting elements and an organic resin having a planarized surface and a light-transmitting property covering the plurality of light-emitting elements and the organic resin having a projected spherical surface and a light-transmitting property.

16 Claims, 12 Drawing Sheets

(56) References Cited

U.S. PATENT DOCUMENTS

| | | | |
|---|---|---|---|
| 2007/0236626 A1* | 10/2007 | Koganezawa | 349/61 |
| 2007/0279727 A1* | 12/2007 | Gandhi et al. | 359/242 |
| 2009/0185584 A1 | 7/2009 | Nomura et al. | |
| 2011/0032450 A1* | 2/2011 | Shigeta et al. | 349/61 |
| 2011/0051043 A1* | 3/2011 | Kim et al. | 349/64 |
| 2011/0058120 A1* | 3/2011 | Oohira | 349/61 |

* cited by examiner

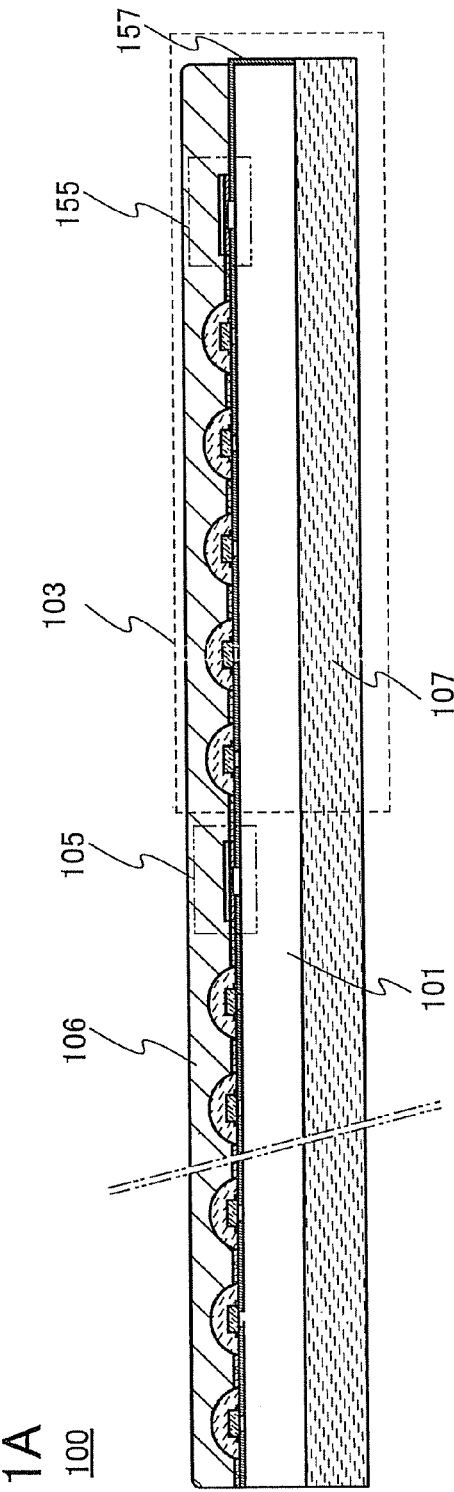
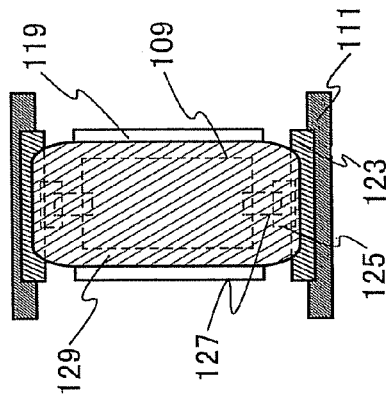
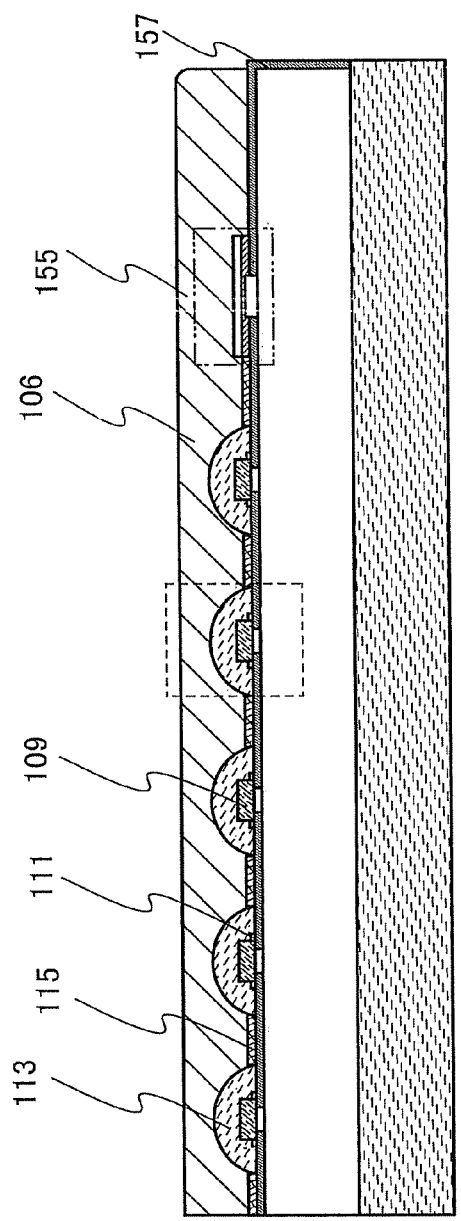
FIG. 1A
FIG. 1B
FIG. 1C

100

100

BACKLIGHT AND DISPLAY DEVICE

BACKGROUND OF THE INVENTION

1. Field of the Invention

The present invention relates to a backlight including a plurality of light-emitting elements and a display device including the backlight.

2. Description of the Related Art

For a backlight of a liquid crystal display device, a cold cathode fluorescent lamp (CCFL) has been used. However, in recent years, a light-emitting diode (LED) unit with less power consumption has come into use instead of the cold cathode fluorescent lamp, because the cold cathode fluorescent lamp consumes much power (see Patent Document 1).

Reference

[Patent Document 1] Japanese Published Patent Application No. 2004-240412

SUMMARY OF THE INVENTION

Then, in order to enhance the image quality of a liquid crystal display device, luminance of light emitted from a backlight needs to be increased. Therefore, a larger amount of current passes through a light-emitting diode which is a light-emitting element of the backlight and power consumption of the backlight is increased even when a light-emitting diode with less power consumption is used. Then, as liquid crystal display devices become larger, the increase in power consumption becomes remarkable.

Accordingly, an object of the present invention is to provide a backlight whose power consumption can be reduced. Further, another object of the present invention is to provide a display device with low power consumption by effective use of light emitted from the backlight.

In view of the above, in order to achieve the objects, a structure having a projection is formed to cover the light-emitting element (for example, a light-emitting diode) with the use of an organic resin having a light-transmitting property. Thus, light extraction efficiency from the light-emitting element can be improved.

Further, a surface of the above structure having a projection, which covers the light-emitting element, is planarized by the organic resin having a light-transmitting property to be solidified (sealed). Note that in this specification, a light-emitting element and an object provided around the light-emitting element, which are solidified, are referred to as a backlight module.

By the above backlight module, the backlight module, an optical member, a first polarizing plate, a liquid crystal panel, and a second polarizing plate can be solidified (bonded together) and an air layer is not interposed, whereby light emitted from the backlight module can efficiently enter the liquid crystal panel. That is, light emitted from the light-emitting element can be efficiently used and power consumption of the backlight (the light-emitting element) and display power of the display device can be reduced.

Accordingly, one embodiment of the present invention is a display device including a light source device in which a plurality of light-emitting elements are arranged; a diffusion plate which is bonded to the light source device; a first polarizing plate which is bonded to the diffusion plate; a liquid crystal panel which is bonded to the first polarizing plate; and a second polarizing plate which is bonded to the liquid crystal panel. Further, the light source device includes an organic resin having a projected spherical surface and a light-transmitting property covering each of the plurality of light-emitting elements; and an organic resin having a planarized surface and a light-transmitting property covering the plurality of light-emitting elements and the organic resin having a projected spherical surface and a light-transmitting property.

In addition, in the above, an optical member for improving front luminance of the display device can be provided as appropriate.

Further, one embodiment of the present invention is a display device including a light source device in which a plurality of light-emitting elements are arranged; a diffusion plate which is bonded to the light source device; an optical member which is bonded to the diffusion plate; a first polarizing plate overlapping with the optical member; a liquid crystal panel which is bonded to the first polarizing plate; and a second polarizing plate which is bonded to the liquid crystal panel. Further, the light source device includes an organic resin having a projected spherical surface and a light-transmitting property covering each of the plurality of light-emitting elements and an organic resin having a planarized surface and a light-transmitting property covering the plurality of light-emitting elements and the organic resin having a projected spherical surface and a light-transmitting property.

In addition, an object which causes scattering of light is formed in the organic resin having a planarized surface and a light-transmitting property of the backlight module, whereby light with uniform brightness can be obtained in the display device without the diffusion plate.

That is, one embodiment of the present invention is a display device including a light source device in which a plurality of light-emitting elements are arranged, a first polarizing plate which is bonded to the light source device, a liquid crystal panel which is bonded to the first polarizing plate, and a second polarizing plate which is bonded to the liquid crystal panel. Further, the light source device includes an organic resin having a projected spherical surface and a light-transmitting property covering each of the plurality of light-emitting elements and an organic resin having a planarized surface and a light-transmitting property and including an object which causes scattering of light to cover the plurality of light-emitting elements and the organic resin having a projected spherical surface and a light-transmitting property.

In the above display device, an optical member for improving front luminance of the display device can be provided as appropriate.

That is, one embodiment of the present invention is a display device including a light source device in which a plurality of light-emitting elements are arranged; an optical member which is bonded to the light source device; a first polarizing plate overlapping with the optical member; a liquid crystal panel which is bonded to the first polarizing plate; and a second polarizing plate which is bonded to the liquid crystal panel. Further, the light source device includes an organic resin having a projected spherical surface and a light-transmitting property covering each of the plurality of light-emitting elements and an organic resin having a planarized surface and a light-transmitting property and including an object which causes scattering of light to cover the plurality of light-emitting elements and the organic resin having a projected spherical surface and a light-transmitting property.

In a display device using the liquid crystal panel of the present invention, monochrome display or color display can be performed with the use of a white light-emitting element. In the case where color display is performed, a coloring layer is provided in the liquid crystal panel, and in the case where full-color display is performed, coloring layers of red (R), green (G), and blue (B) are provided.

Further, for the display device using the liquid crystal panel of the present invention, a field-sequential display device can be used in which, in the case where full-color display is performed, a coloring layer is not used and a light-emitting element that emits red (R) light, a light-emitting element that emits green (G) light, and a light-emitting element that emits blue (B) light are used instead of a white light-emitting element, and the light-emitting elements of three colors are sequentially turned on and the colors are switched, whereby full-color display is performed.

Further, in the structure having a projection of the above backlight module, it is preferable that the light refractive index of the organic resin having a projected spherical surface and a light-transmitting property be greater than that of the organic resin having a planarized surface and a light-transmitting property so that light emitted from the light-emitting element, which is extended radially, can be extracted with a desired shape.

Alternatively, with the use of the above backlight module, a display device in which the transmittance of light emitted from the backlight of each pixel is controlled by MEMS (micro electro mechanical systems) instead of the liquid crystal panel can be manufactured. This display device can perform color display without a coloring layer.

That is, one embodiment of the present invention is a display device including a light source device in which a plurality of light-emitting elements are arranged; a diffusion plate which is bonded to the light source device; a pair of light-transmitting substrates which are bonded to the diffusion plate; a reflective layer including an opening portion, which is formed between the pair of substrates; a movable microstructure including a shutter provided to correspond to the opening portion; and a transistor which is connected to the microstructure. Further, the light source device includes an organic resin having a projected spherical surface and a light-transmitting property covering each of the plurality of light-emitting elements and an organic resin having a planarized surface and a light-transmitting property covering the plurality of light-emitting elements and the organic resin having a projected spherical surface and a light-transmitting property.

In addition, in the above display device using the microstructure, an optical member for improving luminance can be provided as appropriate and an object which causes scattering of light can be formed in the backlight module as appropriate.

The microstructure includes a first movable electrode which is connected to one side of the shutter, a second movable electrode provided in the vicinity of the first movable electrode, and a spring which is connected to the other side of the shutter. The first movable electrode and the spring are electrically connected to a common electrode or a ground electrode and the second movable electrode is electrically connected to the transistor. Further, the shutter included in the movable microstructure is moved in a direction parallel to a surface of the first substrate.

According to the present invention, a backlight of which power consumption can be reduced can be provided. Further, a display device with low power consumption by effective use of light emitted from the backlight can be provided.

BRIEF DESCRIPTION OF THE DRAWINGS

FIGS. 1A and 1B are each a cross-sectional view illustrating a backlight module according to the present invention and FIG. 1C is a top view of a light-emitting element.

DETAILED DESCRIPTION OF THE INVENTION

Figure 2A:
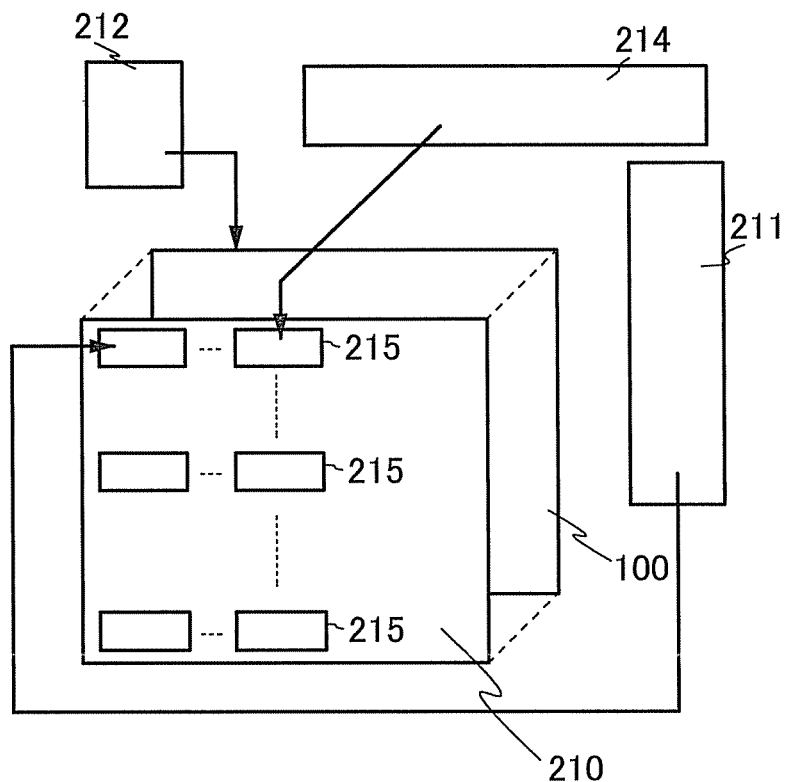
FIGS. 2A and 2B are a block diagram of a display device according to the present invention and a diagram illustrating a circuit configuration of a pixel, respectively.

Embodiments of the present invention will be described in detail with reference to the accompanying drawings. However, the present invention is not limited to the following description and it is easily understood by those skilled in the art that the mode and details can be variously changed without departing from the scope and spirit of the present invention. Therefore, the present invention should not be construed as being limited to the descriptions of the embodiments below. In describing structures of the present invention with reference to the drawings, the same reference numerals are used in common for the same portions in different drawings. The same hatching pattern is applied to similar parts, and the similar parts are not especially denoted by reference numerals in some cases. Note that the size, the layer thickness, or the region of each structure illustrated in each drawing is exaggerated for clarity in some cases. Therefore, the present invention is not necessarily limited to such scales illustrated in the drawings. Note that when all of the structures can not be illustrated in the drawings, two oblique long dashed double-short dashed lines are used to omit part of the drawing in some cases.

Note that when it is described that "A and B are connected to each other", the case where A and B are electrically connected to each other, and the case where A and B are directly connected to each other are included therein. Here, each of A and B corresponds to an object (e.g., a device, an element, a circuit, a wiring, an electrode, a terminal, a conductive film, or a layer).

Note that a voltage refers to a difference between potentials of two points, and a potential refers to electrostatic energy (electric potential energy) of a unit charge at a given point in an electrostatic field. Note that in general, a difference between a potential of one point and a reference potential (e.g., a ground potential) is merely called a potential or a voltage, and a Potential and a voltage are used as synonymous words in many cases. Thus, in this specification, a potential may be rephrased as a voltage and a voltage may be rephrased as a potential unless otherwise specified.

Note that, functions of "source" and "drain" may become switched in the case that a direction of a current flow is changed during circuit operation, for example. Therefore, the terms "source" and "drain" can be used to denote the drain and the source, respectively, in this specification.

(Embodiment 1)

In this embodiment, a backlight module of a liquid crystal display device according to one embodiment of the present invention will be described. The backlight module according to one embodiment of the present invention is a direct-type backlight module.

Figure 12:
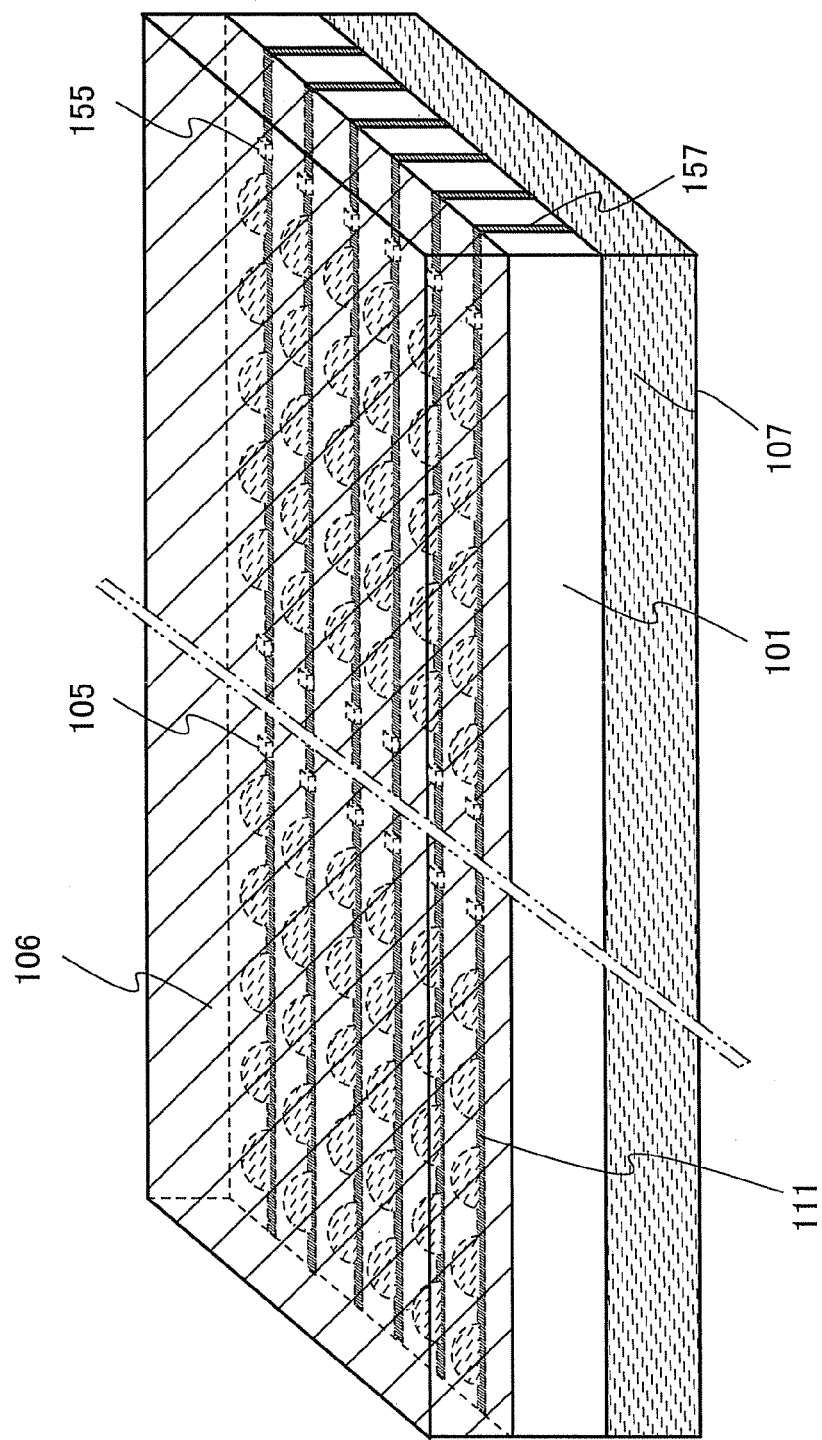
FIG. 12 is a perspective view illustrating a backlight module according to the present invention.

FIG. 1A and FIG. 12 are a cross-sectional view of a backlight module 100 and a perspective view thereof, respectively. The backlight module 100 includes a plurality of light-emitting elements (for example, light-emitting diodes) over a substrate 101. One light-emitting element unit (a portion surrounded by a dotted line 103 in FIG. 1A) includes several of the plurality of light-emitting elements connected in series with wirings 111 and a plurality of light-emitting element units are formed. For example, in this embodiment, one light-emitting element unit includes five light-emitting elements connected in series. Each of the light-emitting element units is electrically connected to another light-emitting element unit by a connector 105. Further, the light-emitting element units of an end portion of the substrate are electrically connected to a control circuit board 107 which is described later by a connector 155 and a wiring 157. Furthermore, the plurality of light-emitting element units formed over the substrate 101 are covered with a light-transmitting organic resin 106.

For the light-emitting element of the present invention, another light-emitting element such as an organic EL element or an inorganic EL element can be used; however, in this embodiment, the light-emitting element corresponds to a light-emitting diode (LED). Therefore, in this specification, a light-emitting element can be alternatively referred to as an LED and an LED can be alternatively referred to as a light-emitting element.

Next, details of the backlight module will be described with the use of one LED unit surrounded by the dotted line 103. FIG. 1B is an enlarged view of a portion surrounded by the dotted line 103.

In the LED unit, LED chips 109 are formed over the substrate 101 with the wirings 111. The LED chips 109 and parts of the wirings 111 are covered with organic resins 113 having projected spherical surfaces and light-transmitting properties. Further, the number of the organic resins 113 having projected spherical surfaces and light-transmitting properties is equal to that of the LED chips 109 and a plurality of reflective sheets 115 are formed between the organic resins 113 having projected spherical surfaces and light-transmitting properties. Furthermore, since the control circuit board 107 that controls a power supply of the LED unit or lighting is provided on the backside of the substrate 101, the wiring is led along the end portion of the substrate 101 and the control circuit board 107 is electrically connected to the LED unit by the connector 155 and the wiring 157. The substrate 101, the LED chips 109, the wirings 111, the organic resins 113 having projected spherical surfaces and light-transmitting properties, the connector 155 and the reflective sheets 115 are covered with the light-transmitting organic resin 106. In addition, the surface of the light-transmitting organic resin 106 is planarized.

When light travels in two kinds of mediums which have different light refractive indexes, in particular, when light travels in a medium having a high refractive index and then in a medium having a low refractive index, refraction or reflection of light occurs at the interface. Many of conventional display devices include air layers. Since the light refractive index of the air is approximately 1, the light from a light source is refracted or reflected and the light from the light source can not be efficiently used. In view of the above, the light-emitting element of the light source is covered with a material that has a higher refractive index than the air, whereby reflection of light from the light-emitting element can be suppressed and thus the light extraction efficiency can be improved. Further, as detailed below, the member forming the liquid crystal display device is bonded by a member that has a higher refractive index than the air and a light-transmitting property, whereby a change in refractive index in the liquid crystal display device is small and reflection of light is suppressed. Thus, light from the light-emitting element can be efficiently used.

Therefore, the organic resin 113 having a projected spherical surface and a light-transmitting property is provided, whereby light which is extended radially can be extracted with a desired shape. Further, since there is not an air layer between the LED chip 109 and the organic resin 113 having a projected spherical surface and a light-transmitting property, reflection of light can be suppressed and light from the LED chip 109 can be efficiently diffused.

Furthermore, in order to make brightness of the light extracted from the organic resin 113 having a projected spherical surface and a light-transmitting property uniform, the organic resin 106 and the organic resin 113 having a projected spherical surface and a light-transmitting property need to have different light refractive indexes. For example, in consideration of ease of optical design, the light refractive index of the organic resin 113 having a projected spherical surface and a light-transmitting property is preferably higher than that of the organic resin 106. At that time, it is preferable that a difference in refractive index be as small as possible so that reflection of light does not occur at the interface.

That is, light emitted from the LED chip 109 does not pass through the air layer and is efficiently emitted from the backlight module as scattered light. Note that reflection of light can be suppressed to the minimum; however, reflection of light can not be eliminated. Therefore, reflected light in the backlight module is reoriented to be emitted from the backlight module by the reflective sheet 115.

FIG. 1C is an enlarged top view of a portion surrounded by a dotted line of FIG. 1B. In FIG. 1C, in order to describe the LED, the organic resin 113 having a projected spherical surface and a light-transmitting property is not illustrated. The LED chip 109 is provided over an LED mounting board 119. The LED mounting board 119 is formed using an organic resin having heat resistance or the like. The number of the LED chips mounted over the LED mounting board 119 may be one or plural in accordance with the desired amount of light; however, in this embodiment, one LED chip is mounted. Note that the LED mounting board 119 is not necessarily provided. When the plurality of LED chips are provided, they are preferably connected in series with the use of a wiring. The LED chip 109 is electrically connected to an electrode 125 which is electrically connected to a terminal electrode 123 by a wiring 127 for connecting. The terminal electrode 123 is formed to overlap with a wiring 111. The wiring 127 for connecting which connects the LED chip 109 and the electrode 125 electrically is formed by a wire bonding method, a flip-chip method or the like.

Further, in this embodiment, at least the LED chip 109 is covered with a phosphor 129 so that white light is emitted. This is to perform full-color display by using a coloring layer (a color filter) for the liquid crystal display device (the details will be described later). When an LED chip that emits blue light is used as the LED chip 109 and a phosphor that exhibits yellow fluorescence is used as the phosphor 129, white light can be emitted. Note that three colors are mixed by using LED chips of a light-emitting element that emits red light (R), a light-emitting element that emits green light (G), and a light-emitting element that emits blue light (B), whereby white light can be emitted. Furthermore, phosphors of red (R), green (G), and blue (B) emit light by an LED or a purple LED that emits a wavelength in a near-ultraviolet region, whereby white light can be emitted.

Moreover, when full-color display is performed without using a coloring layer like a field sequential method, LED chips of a light-emitting element that emits red (R) light, a light-emitting element that emits green (G) light, and a light-emitting element that emits blue (B) light are each provided at regular intervals without using a phosphor.

Next, a method for manufacturing the backlight module 100 in this embodiment will be described.

There is no particular limitation on the substrate 101 as long as it has resistance against heating in the manufacturing process and heat generation in use. For example, a glass substrate, a plastic substrate, and a printed board are given. Specifically, a glass epoxy resin substrate, a polyimide substrate, a ceramic substrate, an alumina substrate, an aluminum nitride substrate, and the like are given.

In addition, when a printed board for the backlight module 100, which is formed in advance by a printing method or the like, is prepared, the wiring 111 which is described later does not need to be formed by an evaporation method, a sputtering method, a droplet discharging method (an ink-jet method, screen printing, offset printing, or the like), a coating method, or the like; therefore, the backlight module 100 can be manufactured with high yield.

There is no particular limitation on a material of the wiring 111 as long as it has conductivity. For example, an element selected from aluminum, nickel, copper, silver, platinum, and gold or an alloy material that contains one of these elements at a content of 50% or more can be given. It is preferable that the wiring 111 be fowled using such a material by an evaporation method or the like. Alternatively, when the wiring 111 is formed without using a mask by a sputtering method or the like, the wiring 111 needs to be electrically disconnected through a photolithography step and an etching step so that the wiring 111 is not shorted to the LED. In addition, the wiring 111 may be fruited by a droplet discharging method, a coating method, or the like. Further, since the wiring 111 is provided on the surface of the substrate 101, the wiring 111 can be used as a reflective film instead of the reflective sheet 115. Note that when a substrate on which the wiring 111 is formed in advance such as a printed board is used, it is particularly preferable that the reflective sheet 115 be used.

The reflective sheet 115 is a substrate, a sheet, or a film which includes white pigment that is a light reflecting coating. Typical examples of the reflective sheet 115 include plastic whose surface is printed with or is coated with white coating of inorganic pigment, organic pigment, or the like such as zinc oxide, titanium oxide, calcium carbonate, silicon oxide, or boron nitride, plastic with which the white coating of inorganic pigment, organic pigment, or the like is mixed, and the like. The plastic includes PET, polyester, polyolefin, or the like. In addition, foamable PET including a fluorescent material can be used. Alternatively, instead of the reflective sheet 115, a white solder resist may be applied on the substrate 101 and the wiring 111. By the reflective sheet 115 or the white solder resist, the light which is emitted from the LED chip 109 to the substrate 101 side can be reflected.

For the LED chip 109, a conventional LED chip such as a molded LED or a surface mount LED can be used. For example, a pin insertion type LED or the like can be used. In this embodiment, white light is emitted from a blue LED and a phosphor that exhibits fluorescence of yellow. As the blue LED, a commercially available blue LED may be used. For example, the blue LED is formed using a Group 13 nitride-based compound semiconductor. Examples of the group 13 nitride-based compound semiconductor include a GaN-based semiconductor which is expressed as the formula of $In_xAl_yGa_{1-x-y}N$ (x is greater than or equal to 0 and less than or equal to 1; y is greater than or equal to 0 and less than or equal to 1; and x+y is greater than or equal to 0 and less than or equal to 1).

For the terminal electrode 123, a material having conductivity is preferably used and the materials given as examples of the wiring 111 can be used, and a film of a metal or an alloy is formed by a droplet discharging method, a coating method, or the like. Alternatively, the terminal electrode 123 may be formed using a conductive paste in which the particles of a metal or an alloy are dispersed. The conductive paste is formed using an alloy containing two or more materials selected from tin, silver, bismuth, copper, indium, nickel, antimony, zinc, or the like.

For the phosphor 129, a conventional phosphor can be used as long as it exhibits fluorescence of yellow. For example, it is preferable that the LED chip 109 be covered with YAG (yttrium aluminum garnet) phosphor or a resin in which silicate-based phosphor is dispersed by a droplet discharging method or a coating method.

The electrode 125 is electrically connected to the terminal electrode 123 and is provided so that the LED chip 109 and the terminal electrode 123 are electrically connected with ease. For the electrode 125, the materials given as examples of the wiring 111 can be used.

The wiring 127 for connecting connects the LED chip 109 and the electrode 125 electrically. It is preferable that the wiring 127 for connecting be formed using a wire bonding method in which a metal thin line formed by gold, an alloy containing gold, copper, or an alloy containing copper is used, a flip-chip method in which an anisotropic conductive adhesive member is used, or the like. Alternatively, the wiring 127 for connecting may be formed using the above conductive paste in which the particles of a metal or an alloy are dispersed by a droplet discharging method, a coating method, or the like.

As described above, the LED chip 109 can be mounted over the substrate 101.

After that, the organic resin 113 having a projected spherical surface and a light-transmitting property is formed over the LED chip 109 mounted over the substrate 101. There is no particular limitation on the kind of organic resin to be formed, and a thermosetting resin, an ultraviolet curable resin, a visible light curable resin, or the like can be used as appropriate. Typically, an epoxy resin, a silicone resin, or the like is given. The above light-transmitting organic resin is formed to have a predetermined height, a predetermined width, and a predetermined curvature radius so that light having a desired shape can be emitted. A droplet discharging method, a coating method, an imprint method, or the like may be used. The organic resin 113 that is molded in advance to have a projected shape may be pressed while it is heated.

The reflective sheet 115 is formed between the organic resins 113 having projected spherical surfaces and light-transmitting properties using any of the above-described materials. The reflective sheet 115 having a sheet-like shape, which is molded in advance, may be provided. Alternatively, the reflective sheet 115 may be formed using any of the above-described materials by a droplet discharging method, a coating method, or the like.

The organic resin 106 is formed to have a flat surface using any of the materials given as examples of the organic resin 113 having a projected spherical surface and a light-transmitting property. At this time, the organic resin 106 is formed so as to contain air as little as possible at the interface between the organic resin 106 and the organic resin 113 having a projected spherical surface and a light-transmitting property. Further, a material having a light refractive index, which can make brightness of the light emitted from the organic resin 113 having a projected spherical surface and a light-transmitting property uniform by the organic resin 106 and is similar to the light refractive index of the organic resin 113 having a projected spherical surface and a light-transmitting property, is selected. In accordance with the selected material, a droplet discharging method, a coating method, a spin coating method, a dipping method, or the like is used. Alternatively, a tool such as a doctor knife, a roll coater, a curtain coater, or a knife coater may be used.

Accordingly, in the backlight module according to one embodiment of the present invention, reflection of light from the light-emitting element can be suppressed and thus the light extraction efficiency can be improved. Accordingly, power consumption of the backlight (the light-emitting element), further, display power of the display device can be reduced.

Note that this embodiment can be implemented in free combination with any of the other embodiments.

(Embodiment 2)

In this embodiment, a liquid crystal display device using the backlight module described in Embodiment 1 will be described.

A liquid crystal display device of this embodiment can be applied to either a passive matrix type or an active matrix type. FIG. 2A illustrates a block diagram showing a structure of an active matrix liquid crystal display device 200.

In FIG. 2A, the liquid crystal display device 200 includes a pixel portion 210 which displays an image, a signal line driver circuit 214, a scan line driver circuit 211, a backlight module 100 which makes light enter on the pixel portion 210, and an LED control circuit 212 which controls a signal to be transmitted to the LED included in the backlight module 100. In addition, the liquid crystal display device 200 includes circuits necessary for operating the liquid crystal display device such as an image processing circuit (an image engine). Further, the signal line driver circuit 214, the scan line driver circuit 211, the LED control circuit 212, and the image processing circuit are provided over the control circuit board 107 illustrated in FIG. 1A. Furthermore, the signal line driver circuit 214, the scan line driver circuit 211, the LED control circuit 212, and the image processing circuit can be largely divided into a logic circuit portion, and a switch portion or a buffer portion, and details of the structures of the circuits are omitted. Further, part or all of the above circuits may be mounted using a semiconductor device such as an IC.

The pixel portion 210 includes a plurality of pixels 215 provided in a liquid crystal panel, and the scan line driver circuit 211 is a circuit for driving the pixels 215 and has a function of outputting a plurality of display selection signals which is a pulse signal. In addition, the signal line driver circuit 214 has a function of generating a display data signal on a basis of an image signal that is input and applying the generated display data signal to a signal line 217 described later.

Figure 2B:
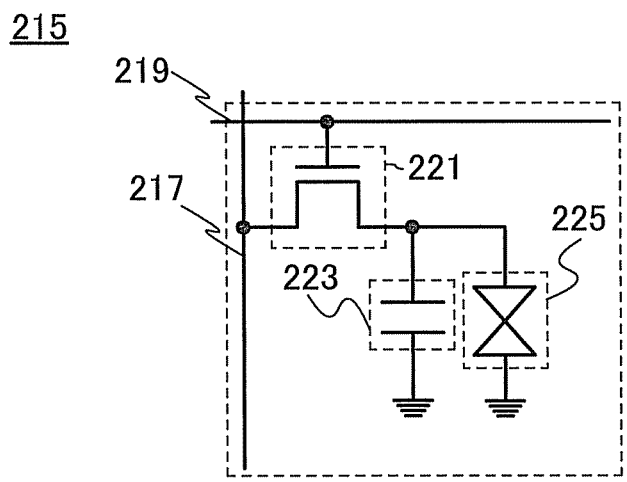

FIG. 2B illustrates a circuit diagram of the pixel 215. In the pixel 215, a transistor (mainly, a thin film transistor: TFT) is provided as a switching element. The pixel 215 includes a transistor 221 in which a gate electrode is electrically connected to a scan line 219 and a source electrode is electrically connected to the signal line 217, a storage capacitor 223 in which one electrode is electrically connected to a drain electrode of the transistor 221 and the other electrode is electrically connected to a wiring (also referred to as a capacitor line) which supplies a constant potential, and a liquid crystal element 225 in which one electrode (also referred to as a pixel electrode) is electrically connected to the drain electrode of the transistor 221 and the one electrode of the storage capacitor 223 and the other electrode (also referred to as a counter electrode) is electrically connected to a wiring which supplies a counter potential.

In this specification, a liquid crystal panel controls transmission or non-transmission of light by optical modulation action of a liquid crystal, whereby an image is displayed. The optical modulation action of a liquid crystal is controlled by an electric field applied to the liquid crystal (including a horizontal electric field, a vertical electric field, and an oblique electric field).

Figure 3A:
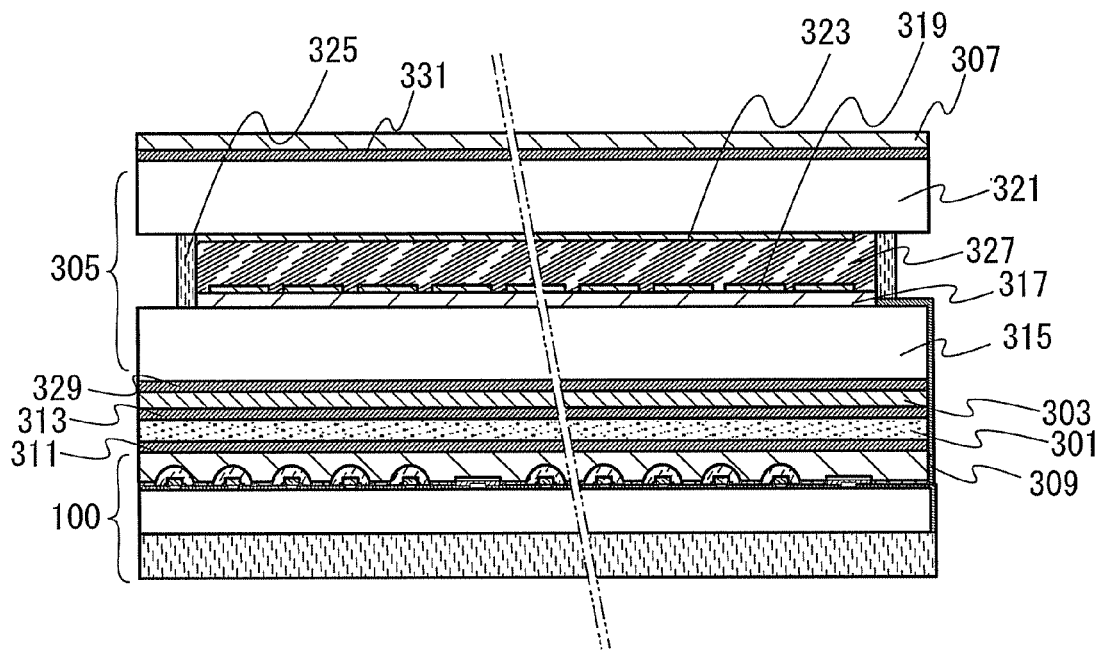
FIGS. 3A and 3B are each a cross-sectional view illustrating a structure of a display device according to the present invention.

Next, the liquid crystal display device 200 will be described with reference to FIGS. 3A and 3B. In FIG. 3A, the liquid crystal display device 200 includes the backlight module 100 described in Embodiment 1, a diffusion plate 301 overlapping with the backlight module 100, a first polarizing plate 303 overlapping with the backlight module 100 and the diffusion plate 301, a liquid crystal panel 305 overlapping with the backlight module 100, the diffusion plate 301, and the first polarizing plate 303, and a second polarizing plate 307 overlapping with the backlight module 100, the diffusion plate 301, the first polarizing plate 303, and the liquid crystal panel 305.

Since the circuits necessary for operating the liquid crystal display device 200 may be provided in the liquid crystal panel 305 and are provided in the backlight module 100 (over the control circuit board 107) in this embodiment, the circuits are electrically connected by the liquid crystal panel 305 and a wiring 309.

As described above, the backlight module 100, the diffusion plate 301, the first polarizing plate 303, the liquid crystal panel 305, and the second polarizing plate 307 are provided to overlap with each other, which serve as a liquid crystal display device. However, each of the diffusion plate 301, the first polarizing plate 303, the liquid crystal panel 305, and the second polarizing plate 307, which is a member forming the liquid crystal display device, has an individual light refractive index which is greater than the light refractive index of air. Accordingly, when the above members are simply overlapped with each other, an air layer is included between the members and part of light emitted from the backlight (the light-emitting element) is reflected at the interface between each of the members and the air layer. That is, the amount of light emitted from the liquid crystal display device is small, as compared with the amount of light emitted from the backlight (the light-emitting element). Therefore, light emitted from the backlight (the light-emitting element) cannot be used efficiently. In view of the above, in the liquid crystal display device 200, in order to use light emitted from the backlight (the light-emitting element) efficiently, the members forming the liquid crystal display device 200 are bonded together with a light-transmitting adhesive.

Therefore, in the liquid crystal display device 200 of this embodiment, each of the backlight module 100, the diffusion plate 301, the first polarizing plate 303, the liquid crystal panel 305, and the second polarizing plate 307 is overlapped with each other and all of them are solidified (bonded together). In the liquid crystal display device 200 in which all of the members are bonded a difference of the light refractive indexes is small and reflection of light is suppressed; therefore, light emitted from the backlight (the light-emitting element) can be used efficiently. Accordingly, power consumption of the backlight (the light-emitting element), further, display power of the display device can be reduced.

Further, in order to improve front luminance of the pixel portion 210 in the liquid crystal display device 200, an optical member for improving luminance can be used as appropriate between the liquid crystal panel 305 and the backlight module 100. At that time, the optical member for improving luminance is bonded to the members forming the liquid crystal display device 200. Note that as the optical member for improving luminance, a luminance enhancement sheet described later or the like can be used.

Next, the details of each member forming the liquid crystal display device 200 will be described.

For the backlight module 100, the backlight module described in Embodiment 1 can be used.

For the diffusion plate 301 which makes brightness of the light emitted from the backlight module 100 uniform, a conventional diffusion plate can be used. For example, a commercially available diffusion plate or formed using an organic resin having a light-transmitting property can be used. Further, it is preferable that the light refractive index be substantially the same as those of other members forming the liquid crystal display device 200 as much as possible. Note that the diffusion plate 301 may have a plate shape or a sheet-like shape (a film shape).

The backlight module 100 and the diffusion plate 301 are bonded to each other with an adhesive 311. The adhesive 311 is a light-transmitting adhesive and it is preferable that the light refractive index be substantially the same as those of the backlight module 100 and the diffusion plate 301 as much as possible. For example, an adhesive containing an epoxy resin, an adhesive containing an urethane resin, an adhesive containing a silicone resin, or the like can be used. In accordance with the selected material, a droplet discharging method, a coating method, a spin coating method, a dipping method, or the like is used. Alternatively, a tool such as a doctor knife, a roll coater, a curtain coater, or a knife coater may be used.

There is no particular limitation on the first polarizing plate 303 that polarizes light emitted from the diffusion plate 301 as long as it can polarize light emitted from the diffusion plate 301. A commercially available polarizing plate may be used or a conventional polarizing plate can be used. For example, a polarizing film which is formed using a high molecule such as polyvinyl alcohol or the like can be used. The first polarizing plate 303 may have a plate shape or a sheet-like shape (a film shape). Further, it is preferable that the light refractive index be substantially the same as those of other members forming the liquid crystal display device 200 as much as possible.

The first polarizing plate 303 is bonded to the diffusion plate 301 bonded with the backlight module 100 using an adhesive 313. The adhesive 313 can be the same as the adhesive 311.

The liquid crystal panel 305 includes a layer having a switching element over a substrate 315 (hereinafter referred to as an element layer 317), a pixel electrode 319 over the element layer 317, a common pixel electrode 323 in contact with a counter substrate 321, a sealant 325, and a liquid crystal 327 which transmits or blocks incident light. Although not shown in FIGS. 3A and 3B, a spacer is provided so that a distance (a cell gap) between the pixel electrode 319 and the common pixel electrode 323 is controlled to be constant. As the spacer, a bead spacer or a spacer obtained by selective etching an insulating film (a post spacer) can be used.

As the substrate 315 and the counter substrate 321, a light-transmitting substrate is preferable, for example, a glass substrate of barium borosilicate glass, aluminoborosilicate glass, or the like; a quartz substrate; or a plastic substrate which can withstand a process temperature in a manufacturing process of the liquid crystal display device 200 and the element layer 317 can be used. Furthermore, as the substrate 315 and the counter substrate 321, a glass substrate in any of the following sizes can be used: the 3rd generation (550 mm×650 mm), the 3.5th generation (600 mm×720 mm, or 620 mm×750 mm), the 4th generation (680×880 mm, or 730 mm×920 mm), the 5th generation (1100 mm×1300 mm), the 6th generation (1500 mm×1850 mm), the 7th generation (1870 mm×2200 mm), the 8th generation (2200 mm×2400 mm), the 9th generation (2400 mm×2800 mm, or 2450 mm×3050 mm), the 10th generation (2950 mm×3400 mm), and the like.

Typical examples of a switching element foamed over the element layer 317 include a transistor. The transistor is described later, and it is preferable that the transistor has a semiconductor having characteristics necessary for functioning as the liquid crystal display device under various situations (for example, a semiconductor which has good temperature characteristics so as to operate even at high temperature or low temperature) in a channel. Amorphous silicon can be used and typical examples of a semiconductor which has better temperature characteristics include microcrystalline silicon which has a plurality of crystal regions or polycrystalline silicon. Alternatively, an oxide semiconductor can be used. As the oxide semiconductor, an In—Ga—Zn—O-based oxide semiconductor and the like are given. Note that the transistor using such as a semiconductor has high reliability and a small variation in the threshold voltage even at a high temperature due to heat generation of the backlight module 100 (particularly, the light-emitting element) or heat from external light, and therefore, the transistor operates with high performance even under an environment whose temperature largely varies.

The pixel electrode 319 and the common pixel electrode 323 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, or indium tin oxide containing silicon oxide.

Alternatively, the pixel electrode 319 and the common pixel electrode 323 can be formed using a conductive composition including a conductive high molecule (also referred to as a conductive polymer). The pixel electrode formed using the conductive composition preferably has a sheet resistance of less than or equal to 10000Ω per square and a transmittance of greater than or equal to 70% at a wavelength of 550 nm. Further, the resistivity of the conductive high molecule included in the conductive composition is preferably less than or equal to 0.1 Ω·cm.

As the conductive high molecule, a so-called π-electron conjugated conductive polymer can be used. For example, polyaniline or a derivative thereof, polypyrrole or a derivative thereof, polythiophene or a derivative thereof, a copolymer of two or more kinds of them, and the like can be given.

The optical modulation action of the liquid crystal 327 is controlled by an electric field (including a horizontal electric field, a vertical electric field, and a diagonal electric field) applied to the liquid crystal 327. Note that the following can be used for the liquid crystal 327 and a driving mode of the liquid crystal element: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a ferroelectric liquid crystal, an anti-ferroelectric liquid crystal, a main chain type liquid crystal, a side chain type high-molecular liquid crystal, a plasma address liquid crystal (PALC), a banana-shaped liquid crystal; a TN (Twisted Nematic) mode, an STN (Super Twisted Nematic) mode, an IPS (In-Plane-Switching) mode, an FFS (Fringe Field Switching) mode, an MVA (Multi-domain Vertical Alignment) mode, a PVA (Patterned Vertical Alignment), an ASV (Advanced Super View) mode, an ASM (Axially Symmetric aligned Micro-cell) mode, an OCB (Optical Compensated Birefringence) mode, an ECB (Electrically Controlled Birefringence) mode, an FLC (Ferroelectric Liquid Crystal) mode, an AFLC (Anti Ferroelectric Liquid Crystal) mode, a PDLC (Polymer Dispersed Liquid Crystal) mode, a guest host mode, and the like. Note that this invention is not limited thereto, and various kinds of liquid crystal elements can be used. The alignment of the liquid crystal 327 can easily performed by rubbing treatment with the use of an alignment film.

Alternatively, a blue-phase liquid crystal for which an alignment film is not necessary may be used for the liquid crystal 327. A blue phase is one of liquid crystal phases, which is generated just before a cholesteric phase changes into an isotropic phase while temperature of a cholesteric liquid crystal is increased. Note that since the blue phase is generated within an only narrow range of temperature, a liquid crystal composition containing a chiral agent so as to improve the temperature range is preferably used for the liquid crystal 327. As for the liquid crystal composition which contains a blue-phase liquid crystal and a chiral agent, the response speed is as high as 10 μs to 100 μs, alignment treatment is not necessary due to optical isotropy, and viewing angle dependence is low.

The sealant 325 is provided to seal the liquid crystal 327 between the substrate 315 and the counter substrate 321.

As the sealant 325, it is typically preferable to use visible light curable, ultraviolet curable, or heat curable resin. Typically, an acrylic resin, an epoxy resin, an amine resin, or the like can be used. Alternatively, a photopolymerization initiator (typically, an ultraviolet light polymerization initiator), a thermosetting agent, a filler, or a coupling agent may be included in the sealant 325.

The liquid crystal panel 305 is bonded to the first polarizing plate 303 bonded with the backlight module 100 and the diffusion plate 301 using an adhesive 329. The adhesive 329 can be the same as the adhesive 311.

There is no particular limitation on the second polarizing plate 307 that polarizes light emitted from the liquid crystal panel 305 as long as it can polarize light emitted from the liquid crystal panel 305. The second polarizing plate 307 can be the same as the first polarizing plate 303. Further, it is preferable that the light refractive index be substantially the same as those of other members forming the liquid crystal display device 200 as much as possible. A slit of the second polarizing plate 307 and a slit of the first polarizing plate 303 are arranged so as to dissect at right angles. The second polarizing plate 307 may have a plate shape or a sheet-like shape (a film shape).

The second polarizing plate 307 is bonded to the liquid crystal panel 305 bonded with the backlight module 100, the diffusion plate 301, and the first polarizing plate 303 using an adhesive 331. The adhesive 331 can be the same as the adhesive 311.

In this manner, the liquid crystal display device 200 can be manufactured. Note that in this embodiment, for the members forming the liquid crystal display device 200, a commercially available product or a conventional product can be used. In order to obtain an effect of the present invention further, in consideration of the light refractive indexes of the adhesives 311, 313, and 329, the liquid crystal display device 200 can be manufactured, with the use of the diffusion plate 301, the first polarizing plate 303, the liquid crystal panel 305, and the second polarizing plate 307, in which an optical design is newly performed.

Next, as another embodiment of the liquid crystal display device 200, a liquid crystal display device 300 in which an optical member which improves front luminance of light which is emitted from the backlight module 100 and whose brightness is made uniform by the diffusion plate 301 is provided between the diffusion plate 301 and the first polarizing plate 303 will be described.

Figure 3B:
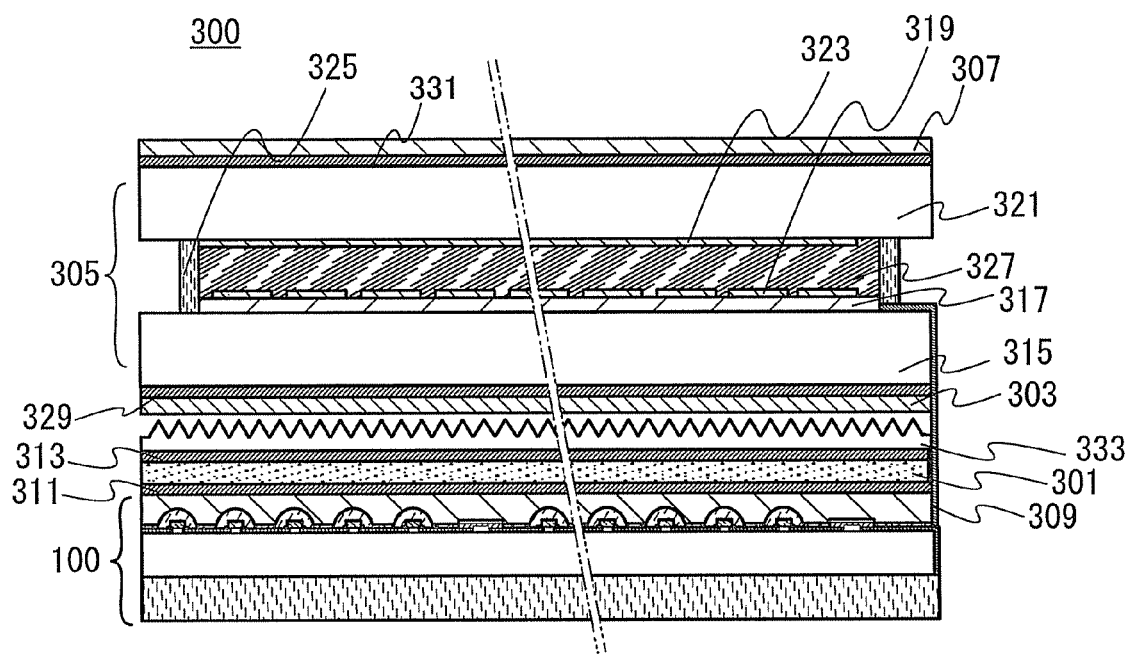

FIG. 3B is a cross-sectional view of the liquid crystal display device 300. In the liquid crystal display device 300, not all of the members forming the liquid crystal display device are bonded together. As an optical member 333 which improves front luminance of the pixel portion in the liquid crystal display device, an optical member which is a luminance enhancement sheet (film) such as a prism sheet or a microlens sheet, in order to make light perpendicular to the liquid crystal panel 305 enter as much as possible is given. In a commercially available prism sheet or a commercially available microlens sheet, an optical design to the light refractive index of the air is performed. In addition, they are difficult to be processed to be uneven and expensive optical members. Therefore, it is not effective from an aspect of a manufacturing cost of the liquid crystal display device to process and manufacture a prism sheet or a microlens sheet in consideration of the light refractive indexes of the adhesives 311, 313, 329, and 331 to bond together all the members like the liquid crystal display device 200. That is, in the liquid crystal display device 300, material cost is high, and only the optical member 333 which improves front luminance of the pixel portion and the first polarizing plate 303 are not bonded to each other.

The backlight module 100 and the diffusion plate 301 are the same as those described in the liquid crystal display device 200 and can be manufactured in the same manner.

The optical member 333 is bonded with the diffusion plate 301 bonded with the backlight module 100 using the adhesive 313. For the optical member 333, a luminance enhancement sheet (film) such as a conventional prism sheet, a commercially available prism sheet, a conventional microlens sheet, or a commercially available microlens sheet, as described above, can be used. Only one sheet of one kind of a luminance enhancement sheet (film) can be used (for example, one sheet of one kind of a prism sheet); however, a plurality of sheets of different kinds of a luminance enhancement sheet (film) can be used. In this manner, front luminance of the pixel portion in the liquid crystal display device can be improved. Note that it is preferable that the plurality of luminance enhancement sheets (films) be provided so that air is included therebetween.

Further, the first polarizing plate 303, the liquid crystal panel 305, and the second polarizing plate 307 are the same as those described in the liquid crystal display device 200 and can be manufactured in the same manner. Furthermore, each of them is bonded using the adhesives 329 and 331.

The backlight module 100 bonded with the diffusion plate 301 and the optical member 333 overlaps with the liquid crystal panel 305 as described in the liquid crystal display device 200 bonded with the first polarizing plate 303 and the second polarizing plate 307, whereby the liquid crystal display device 300 can be manufactured.

Next, in the above liquid crystal display devices 200 and 300, a method in which makes brightness of the light emitted from the backlight module 100 uniform without the diffusion plate 301 will be described. As the method, a diffusion member is formed in the organic resin 106 (see FIGS. 1A and 1B) having a planarized surface and a light-transmitting property in the backlight module 100. An organic resin having a different light refractive index is included in the organic resin 106. At that time, the diffusion member may be a particle shape or a polygonal shape as long as it can have unevenness in the organic resin 106. As the manufacturing method, a first organic resin is formed to have a desired thickness and shape (to have unevenness) over the organic resin 113 having a projected spherical surface and a light-transmitting property, which covers the LED chip 109, the connector 105, and the reflective sheet 115 so that air is not included. Next, a second organic resin having a light refractive index which is different from the light refractive index of the first organic resin is formed over the first organic resin to have a planarized surface. The first organic resin and the second organic resin are formed using the method described in the organic resin 113 having a projected spherical surface and a light-transmitting property and the organic resin 106 as described in Embodiment 1. Note that an organic resin having a particle shape may be provided for the first organic resin. In this manner, the liquid crystal display device can be manufactured while the material cost is reduced.

In the liquid crystal display devices 200 and 300, monochrome display or color display can be performed. Specifically, the liquid crystal display device is provided with a coloring layer serving as a color filter. In the case where the liquid crystal display device performs full-color display, the color filter can be formed using materials which exhibit red (R), green (G), and blue (B). In the case where the liquid crystal display device performs mono-color display other than monochrome display, the color filter can be formed using a material which exhibits at least one color.

Further, the color filter may be provided in the liquid crystal panel 305. At that time, the color filter can be provided on the substrate 315 side (particularly, the element layer 317) or on the counter substrate 321 side (the counter substrate 321 and the common pixel electrode 323). Alternatively, the color filter may be provided outside the counter substrate 321 of the liquid crystal panel 305 (on the side opposite to the liquid crystal 327 with the counter substrate 321 therebetween). At that time, the color filter is provided between the counter substrate 321 and the second polarizing plate 307, the counter substrate 321, the color filer, and the second polarizing plate 307 are bonded together using the adhesive.

The color filter is formed using a photosensitive resin in which a red, blue, green, or yellow pigment is dispersed. As a manufacturing method of the color filter, an etching method by using a colored resin, a color resist method by using a color resist, a staining method, an electrodeposition method, a micelle electrolyszation method, an electrodeposition transfer method, a film dispersion method, an inkjet method (droplet discharging), or a silver salt color development method, or the like is given.

The thickness of the color filter may be controlled as appropriate in consideration of the relationship between the concentration of the coloring material to be included and the transmittance of light.

Further, when the color filter is provided in the liquid crystal panel 305, the color filter may be separately provided or in the case of an active matrix liquid crystal display device, the color filter can be provided as an interlayer insulating film included in the element layer 317. For example, as the interlayer insulating film, a light-transmitting chromatic color resin functioning as a color filter is used.

In the case where the interlayer insulating film is formed directly on the element substrate side as the color filter, the problem of misalignment between the color filter and a pixel region does not occur, whereby the formation region can be controlled more precisely even when a pixel has a minute pattern. In addition, the same insulating film serves as the interlayer insulating film and the color filter, which brings advantages of process simplification and cost reduction.

As the light-transmitting chromatic color resin that can be used for the color filter, a photosensitive organic resin or a non-photosensitive organic resin can be used. Use of the photosensitive organic resin layer makes it possible to reduce the number of resist masks; thus, the steps are simplified, which is preferable.

Chromatic colors are colors except achromatic colors such as black, gray, or white. The coloring layer is formed of a material which only transmits light colored with chromatic color in order to function as the color filter. As chromatic color, red, green, blue, or the like can be used. Alternatively, cyan, magenta, yellow, or the like may also be used. "Transmitting only the chromatic color light" means that light transmitted through the coloring layer has a peak at the wavelength of the chromatic color light.

Note that in the case where the thickness of the light-transmitting chromatic color resin varies depending on the chromatic color or in the case where there is unevenness due to a transistor or the like in the liquid crystal panel 305, an insulating film which transmits light in the visible wavelength range (a so-called colorless and transparent insulating film) may be stacked for planarization. The improved planarization allows favorable coverage with a pixel electrode or the like formed over the color filter, and a uniform cell gap, whereby the visibility of the liquid crystal display device is increased and higher image quality can be achieved.

Next, a driving method of the LED unit included in the backlight module in the liquid crystal display device of one embodiment of the present invention will be described.

Figure 4A:
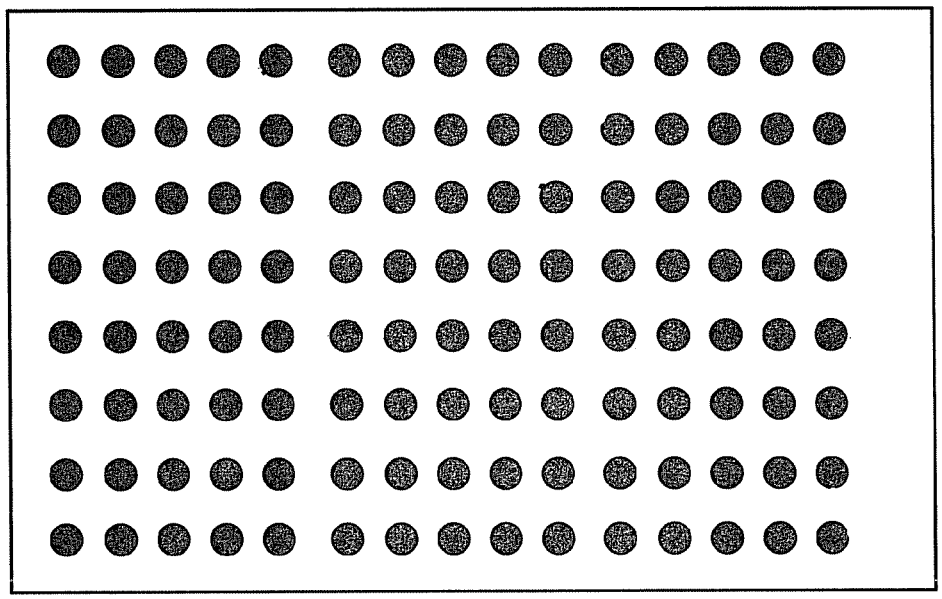
FIGS. 4A and 4B illustrate a driving method of an LED unit according to the present invention.

In the liquid crystal display device, transmission or non-transmission of light is controlled by a liquid crystal of the liquid crystal panel while the LED unit (the light-emitting element) is constantly turned on, whereby an image is displayed, which is simple because a complicated light-emitting element control circuit is not needed (see FIG. 4A).

However, it is said that power consumption of the backlight (the light-emitting element) accounts for the major part of that of the liquid crystal display device. That is, it is not preferable that the backlight (the light-emitting element) is constantly turned on, in view of power consumption.

Figure 4B:
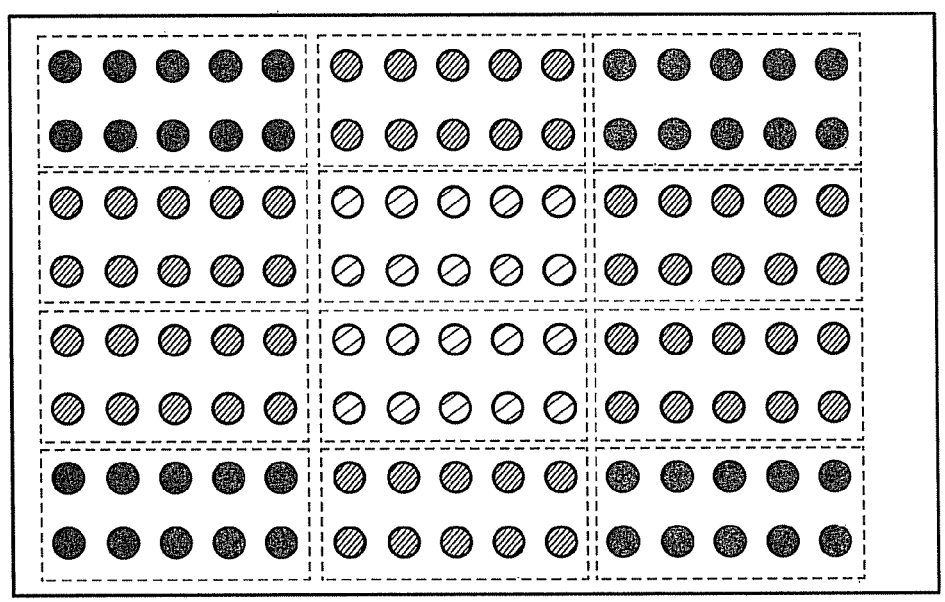

Accordingly, as an effective driving method of an LED unit in the direct-type backlight module 100 of one embodiment of the present invention, a method called local dimming in which the LED units are divided into a plurality of regions and each of the LED units itself makes a contrast per region in accordance with the contrast density of display image data is given (see FIG. 4B). That is, in the regions of the LED units corresponding to a black part of the image, the luminance of the LED units is lowered, and in the regions of the LED units corresponding to a bright part of the image, the luminance of the LED units is increased. The LED units are driven using this method, whereby contrast ratio of images can be improved and a reduction in power consumption of the backlight (the light-emitting element) can be realized.

Next, in the backlight module 100, a method in which full-color display is performed, which is different from a method in which full-color display is performed using a white LED and a color filter provided in the liquid crystal display device will be described.

In the method, in the backlight module 100, a color of light emitted from each of the LEDs is changed every unit period, with the use of the LEDs of a light-emitting element that emits red light (R), a light-emitting element that emits green light (G), and a light-emitting element that emits blue light (B), whereby full-color display is performed (also referred to as a field sequential method). In particular, the field sequential method in which reduction in color breakup is achieved and the quality of a display image can be improved will be described with reference to FIGS. 2A and 2B and FIG. 5.

As described below, the scan line driver circuit 211 is a circuit for driving the pixels 215 and has a function of outputting a plurality of display selection signals which is a pulse signal. The scan line driver circuit 211 includes, for example, a shift register. The scan line driver circuit 211 can output a display selection signal by outputting a pulse signal from the shift register. Further, the output display selection signal is input to the corresponding pixel 215.

Furthermore, an image signal is input to the signal line driver circuit 214. In addition, the signal line driver circuit 214 has a function of generating a display data signal on a basis of the input image signal and outputting the generated display data signal. The signal line driver circuit 214 includes a switching element (a transistor: mainly, a thin film transistor), for example. The signal line driver circuit 214 can output data of an image signal as a display data signal when the transistor is on. The transistor can be controlled by inputting a control signal, which is a pulse signal, to the current control terminal. Alternatively, the plurality of transistors are selectively turned on or off, whereby data of an image signal may be output to the plurality of pixels 215 as a plurality of display data signals.

The backlight module 100 is formed using the LEDs of red (R), green (G), and blue (B), and includes a plurality of light-emitting diode groups, which are provided in a plurality of rows.

Further, the plurality of pixels 215 illustrated in FIG. 2A are arranged in the M (M is a natural number of 2 or more) rows and the N (N is a natural number) columns and overlap with the backlight module 100. For example, the pixels 215 in each row overlap with the light-emitting diode group in one row of the backlight module 100. To the pixels 215, a display selection signal that is a pulse signal is input, and a display data signal is input in accordance with the input display selection signal.

Since a display selection transistor (mainly, a thin film transistor) and the liquid crystal element 225 are provided in the pixel 215, the display selection transistor selects whether data of a display data signal is input to the liquid crystal element 225 or not.

The liquid crystal element 225 has a function of changing its display state corresponding to data of a display data signal by input of the data of the display data signal in accordance with the display selection transistor.

In the driving method of the field sequential method described in this embodiment, input operation and light-emitting operation are repeatedly performed Z (Z is a natural number greater than or equal to 3) times.

In the input operation, pulses of different display selection signals are sequentially input to the pixels 215 in respective rows. For example, a display region of the liquid crystal display device in this embodiment is divided into a plurality of display region each including pixel provided in one or more rows and each including light-emitting diode groups provided in one or more rows, and in each of the plurality of display regions, pulses of different display selection signals are sequentially input to the pixels 215 in respective rows.

For example, in the case where the scan line driver circuit 211 includes a shift register, a pulse of a start pulse signal is input to the shift register, and pulses of a plurality of pulse signals of the shift register are sequentially output. Moreover, another pulse of a start pulse signal is input while the pulses of the plurality of pulse signals of the shift register are sequentially output, whereby pulses of different display selection signals can be sequentially and repeatedly input to the pixels 215 in respective rows in the plurality of display regions.

While a pulse of a display selection signal is input to the pixel 215, a display data signal is input to the pixel 215, and the pixel 215 is brought into a writing state (a state wt). Further, after a pulse of a display selection signal is input, the pixel 215 is set in a display state (a state hld) in accordance with the input display data.

In the light-emitting operation, every input of a pulse of the display selection signal to the pixels 215 provided in one or more rows, one or more of a red light-emitting diode, a green light-emitting diode, and a blue light-emitting diode emit(s) light. For example, every input of a pulse of the display selection signal to the pixels 215 provided in one or more rows, in each of the plurality of display regions as described above, one or more of a red light-emitting diode, a green light-emitting diode, and a blue light-emitting diode of the light-emitting diode groups in different rows emit(s) light. Lights emitted from the light-emitting diodes exhibit different colors in the plurality of display regions. In this manner, light is sequentially emitted from the light-emitting diode groups to the pixel where a pulse of the display selection signal is input.

Further, when input operation and light-emitting operation are repeatedly performed plural times, in a K-th (K is a natural number greater than or equal to 2 and less than or equal to Z) light-emitting operation, the light-emitting diode exhibiting a color that is different from the color emitted in a (K−1)-th light-emitting operation emits light. For example, in a K-th light-emitting operation, in each of the plurality of display regions, the light-emitting diode exhibiting a color that is different from the color emitted in the (K−1)-th light-emitting operation emits light.

Figure 5:
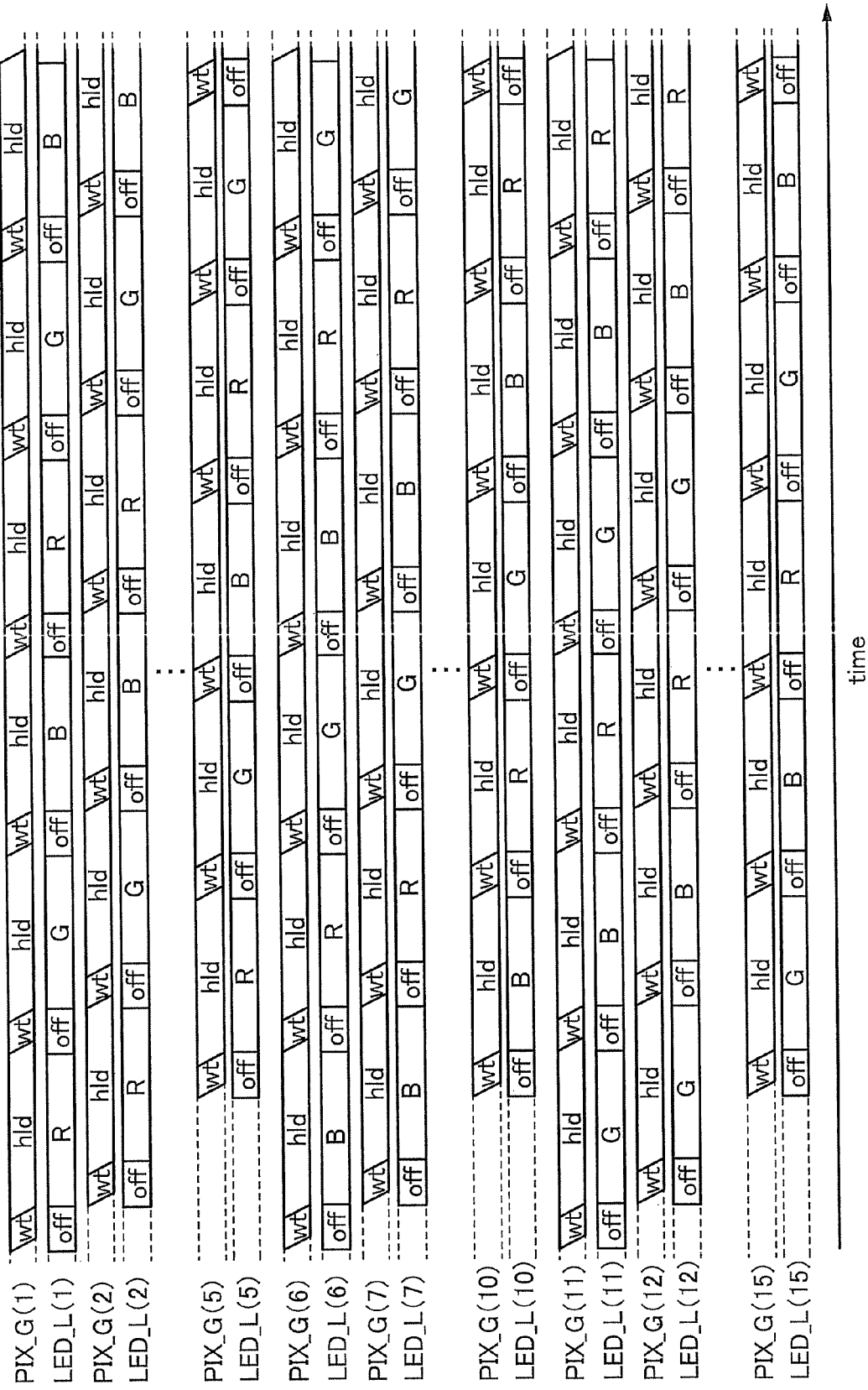
FIG. 5 illustrates a driving method of a display device according to the present invention.

Further, the driving method of the field sequential method described in this embodiment will be described with reference to FIG. 5. FIG. 5 is a timing chart for describing the example of the driving method of the field sequential method described in this embodiment.

For example, a region forming the plurality of pixels 215 is divided into three display regions. Further, as shown in FIG. 5, the plurality of pixels 215 of a first display region are divided into the pixels 215 (also referred to as pixel PIX_G (1)) in the first group to the pixels 215 (also referred to as pixel PIX_G(5)) in the fifth group every pixels 215 provided in a plurality of rows. The plurality of pixels 215 of a second display region are divided into the pixels 215 (also referred to as pixel PIX_G(6)) in the sixth group to the pixels 215 (also referred to as pixel PIX_G(10)) in the tenth group every pixels 215 provided in a plurality of rows. The plurality of pixels 215 of a third display region are divided into the pixels 215 (also referred to as pixel PIX_G(11)) in the eleventh group to the pixels 215 (also referred to as pixel PIX_G(15)) in the fifteenth group every pixels 215 provided in a plurality of rows. Note that the number of rows of the pixels 215 in each group is not limited to five rows.

Further, input operation and light-emitting operation are repeatedly performed Z times.

In the input operation, in each display region, the pixels 215 in each group are set in a writing state (a state wt) sequentially from the pixels 215 in the first group. At this time, in each group, the pixels 215 are changed to a writing state sequentially from the pixels 215 in the first row and are set in a display state (a state hld) in accordance with the input display data. Note that light irradiation is not performed from the LED chip 109 on the pixel circuit where the light-emitting diode groups included in the backlight module 100 are put in an unlighted state (also referred to as a state off) as appropriate, and then writing operation is performed.

Further, in the light-emitting operation, in each of the first display region to the third display region, every writing of the pixels 215 in each group, the LED exhibiting different colors in each of the first display region to the third display region of one or more of a red LED, a green LED, and a blue LED of the light-emitting diode groups of the LED chips 109 in different rows emits light. Every pixels 215 in the group to which the display data is input, light irradiation is performed from the backlight module 100.

Further, in a K-th (K is a natural number greater than or equal to 2 and less than or equal to Z) light-emitting, operation, in each of the first display region to the third display region, the light-emitting diode exhibiting a color that is different from the color emitted in a (K−1)-th light-emitting operation emits light.

For example, as shown in FIG. 5, light-emitting operation may be performed every input operation in the following manner. In the first display region, the LEDs of the light-emitting diode groups in respective rows emit light in the order of red, green, and blue. In the second display region, the LEDs of the light-emitting diode groups in respective rows emit light in the order of blue, red, and green. In the third display region, the LEDs of the light-emitting diode groups in respective rows emit light in the order of green, blue, and red. Note that the color and the order of the LED emits light are not limited to this.

For example, light-emitting operation may be performed every input operation in the following manner. In the first display region, the LEDs of the light-emitting diode groups in respective rows emit light in the order of red, green, blue, red and green, green and blue, and blue and red. In the second display region, the LEDs of the light-emitting diode groups in respective rows emit light in the order of blue and red, red, green, blue, red and green, and green and blue. In the third display region, the LEDs of the light-emitting diode groups in respective rows emit light in the order of green and blue, blue and red, red, green, blue, and red and green.

In the driving method of the field sequential method described in this embodiment, in each of the plurality of display regions which are divided into the pixel circuits provided in one or more rows and the light-emitting diode groups provided in one or more rows, input operation in which a pulse of a display selection signal is sequentially input to each pixel in respective rows and light-emitting operation, in which, in each of the plurality of display regions, every input of a pulse of the display selection signal to the pixels provided in one or more rows, in each of the plurality of display regions, the LED exhibiting different colors in each of the plurality of display regions of one or more of a red LED, a green LED, and a blue LED of the light-emitting diode groups in different rows emits light are repeatedly performed Z times. In the K-th light-emitting operation, in each of the plurality of display regions, the LED exhibiting a color that is different from the color emitted in the (K−1)-th light-emitting operation emits light.

Note that with the above structure, since operation of writing data of the display data signal to the pixels can be performed in parallel on the plurality of groups, time of data writing operation for all the pixels can be shortened. Accordingly, the increase in the number of writing of the display data is easily performed and reduction in color breakup is easily achieved.

Further, with the above structure, while light irradiation is performed on the pixels in one group, data of a display data signal can be written in the pixel circuits in other groups; therefore, a minimum required operation time can be shortened.

Accordingly, the increase in the number of writing of the display data is easily performed and reduction in color breakup is easily achieved.

According to the above, image quality of a display image can be improved.

Here, the details of the liquid crystal panel 305 will be described. First, an active matrix type which can be used for the driving method of the above field sequential method will be described with reference to FIGS. 2A and 2B and FIGS. 6A and 6B.

Figure 6A:
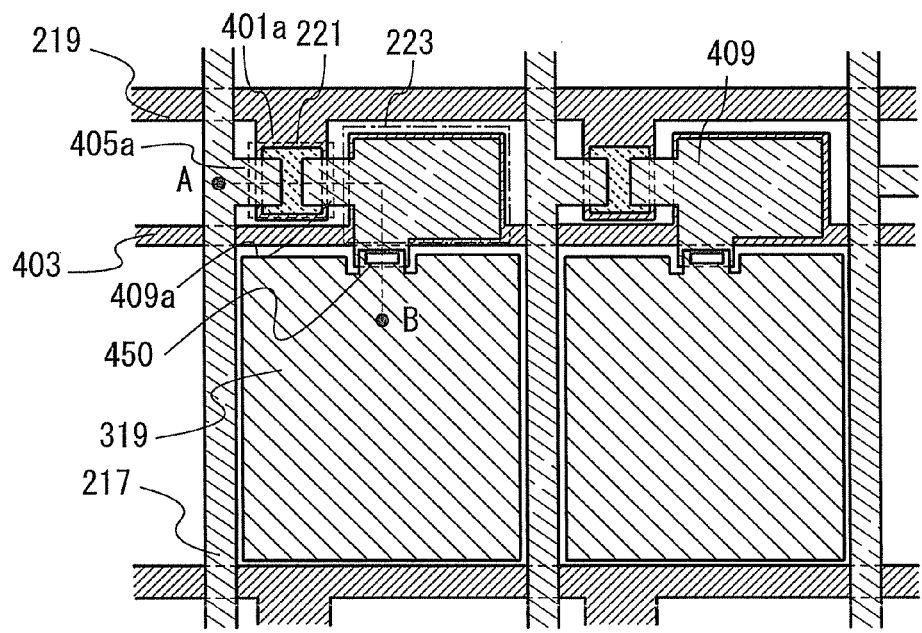
FIGS. 6A and 6B are a top view and a cross-sectional view illustrating a structure of a display device according to the present invention, respectively.

FIG. 6A is a top view of two pixels of the liquid crystal panel 305.

In FIG. 6A, a plurality of signal lines 217 (including a source electrode 405a) are provided in parallel (extends upward and downward in the drawing) and apart from each other. A plurality of scan lines 219 (including the gate electrode 401a) is extended in a direction generally perpendicular to the signal lines 217 (a horizontal direction in the drawing) and provided apart from each other. The plurality of signal lines 217 are connected to the signal line driver circuit 214 (see FIG. 2A) and the plurality of scan lines 219 and capacitor wirings 403 are connected to the scan line driver circuit 211 (see FIG. 2A).

In addition, the capacitor wirings 403 are adjacent to the plurality of scan lines 219 and extend in a direction parallel to the scan lines 219, that is, in a direction generally perpendicular to the signal lines 217 (in the horizontal direction in the drawing). A storage capacitor 223 is surrounded by a dotted line in FIG. 6A, and includes a gate insulating film 402 serving as a dielectric, the capacitor wiring 403, and a drain wiring 409 (including a drain electrode 409a). The pixel electrode 319 is electrically connected to the drain electrode 409a via an opening 450.

The transistor 221 for driving the pixel electrode 319 is provided at an upper left corner of the drawing. A plurality of pixel electrodes 319 and a plurality of transistors 221 are arranged in matrix.

Figure 6B:
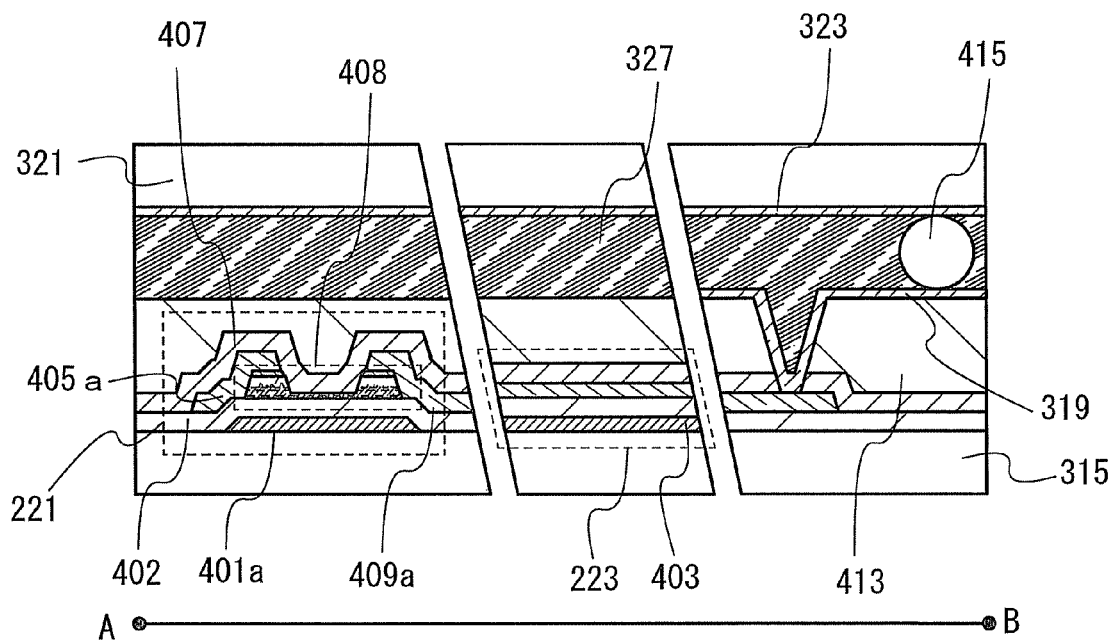

This embodiment is not limited to the pixel configuration illustrated in FIGS. 6A and 6B. Alternatively, a configuration may be employed, in which a capacitor wiring is not provided and a pixel electrode is provided to overlap with a scan line of an adjacent pixel with a gate insulating film and another insulating film provided therebetween to form a storage capacitor. In this case, the capacitor wiring can be omitted, whereby the aperture ratio of a pixel can be increased.

FIG. 6B is a cross-sectional view taken along a line A-B in FIG. 6A. Separated portions in FIG. 6B are omitted portions between a line A-B in FIG. 6A.

Here, the structure of the transistor 221 will be described. The transistor 221 is an inverted-staggered thin film transistor (TFT) which includes, over a substrate 315 having an insulating surface, the gate electrode 401a, a gate insulating film 402, a semiconductor layer 408, the source electrode 405a, and the drain electrode 409a. They can be manufactured through a desired formation process, a desired photolithography step, and a desired etching process.

Note that there is no particular limitation on a structure of a transistor which can be applied to the liquid crystal panel 305. For example, a top-gate staggered structure, a bottom-gate staggered structure, a top-gate planar structure, a bottom-gate planar structure, or the like can be used. The transistor may have a single-gate structure in which one channel formation region is formed, a double-gate structure in which two channel formation regions are funned, or a triple-gate structure in which three channel formation regions are formed. Alternatively, the transistor may have a dual gate structure including two gate electrodes positioned above and below a channel region with gate insulating films provided therebetween. In this embodiment, a single-gate structure is employed.

An insulating film 407 in contact with the semiconductor layer 408 and an interlayer insulating film 413 over the insulating film 407 are stacked to cover the transistor 221.

As described above, it is preferable that the semiconductor layer 408 include a semiconductor having characteristics necessary for functioning as the liquid crystal display device under various situations (for example, a semiconductor which has good temperature characteristics so as to operate even at high temperature or low temperature). Amorphous silicon can be used and typical examples of a semiconductor which has better temperature characteristics include microcrystalline silicon which has a plurality of crystal regions or polycrystalline silicon. Alternatively, an oxide semiconductor can be used. As the oxide semiconductor, an In—Ga—Zn—O-based oxide semiconductor and the like are given. Note that the transistor using such as a semiconductor has high reliability and a small variation in the threshold voltage even at a high temperature due to heat generation of the backlight module 100 (particularly, the light-emitting element) or heat from external light, and therefore, the transistor operates with high performance even under an environment whose temperature largely varies.

Further, in the storage capacitor 223 shown by a dotted line, the gate insulating film 402 serving as a dielectric is stacked between the capacitor wiring 403 and the drain electrode 409a as described above. The capacitor wiring 403 is provided in the same layer and formed under the same condition as the gate electrode 401a; therefore, the capacitor wiring 403 is formed at the formation of the gate electrode 401a. That is, the storage capacitor 223 is not necessary to be formed separately from the transistor 221 and can be manufactured by a desired photolithography and through the procedure for manufacturing the transistor 221.

The interlayer insulating film 413 is formed over the transistor 221 and the storage capacitor 223 formed over the substrate 315. There is no particular limitation on the method of forming the interlayer insulating film 413, and any of the following methods or tools can be used depending on a material thereof: a method such as a CVD method, a sputtering method, a spin coating method, a dipping method, a spray coating method, or a droplet discharge method (e.g., an ink-jet method, screen printing, or offset printing), or a tool such as a roll coater, a curtain coater, a knife coater, or the like.

An opening is formed .in the interlayer insulating film 413 through a desired photolithography step and a desired etching process, and the pixel electrode 319 is formed and is electrically connected to the drain electrode 409a. Further, the common pixel electrode 323 is formed on the counter substrate 321. The pixel electrode 319 and the common pixel electrode 323 can be formed using any of the above-described materials by a CVD (Chemical Vapor Deposition) method, a sputtering method, or the like.

The substrate 315 and the counter substrate 321 are fixed to each other with the liquid crystal 327 interposed therebetween with the sealant 325 (see FIGS. 3A and 3B). The sealant 325 and the liquid crystal 327 described above can be used. The liquid crystal 327 can be formed by a dispenser method (a dropping method), or an injection method by which a liquid crystal is injected using a capillary phenomenon or the like after the substrate 315 is fixed to the counter substrate 321. Further, the alignment of the liquid crystal 327 can easily performed by rubbing treatment with the use of an alignment film. In the case where, for example, a photocurable resin such as an ultraviolet curable resin is used for the sealant 325 and a liquid crystal layer is formed by a dropping method, the sealant 325 may be cured in the light irradiation step of the polymer stabilization treatment.

In addition, a spacer 415 is provided so that the distance (the cell gap) between the pixel electrode 319 and the common pixel electrode 323 is controlled to be constant. Although a bead spacer is used here, a spacer obtained by selectively etching an insulating film (a post spacer) may be used. In the liquid crystal display device including the liquid crystal 327, the cell gap is preferably greater than or equal to 1 μm and less than or equal to 20 μm. Note that in this specification the thickness of the cell gap refers to the length of a thickest part of the liquid crystal 327.

Further, a light-blocking layer (a black matrix) can be provided in an area overlapping with a semiconductor layer of the transistor 221 or a contact hole, between pixels, or the like.

The light-blocking layer may be provided on the inner side (a liquid crystal side) or the outer side (on the opposite side from a liquid crystal with the counter substrate 321 interposed therebetween) of the liquid crystal panel 305.

In the case where the light-blocking layer is provided on the inner side of the liquid crystal panel 305, the light-blocking layer may be provided on the substrate 315 side where the pixel electrode 319 is provided, or may be provided on the counter substrate 321 side. The light-blocking layer may be separately formed or can be formed as the interlayer insulating film 413 included in the element layer 317. For example, the light-blocking layer can be used in part of the interlayer insulating film 413.

The light-blocking layer is formed using a light-blocking material that reflects or absorbs light. For example, a black organic resin can be used, which can be formed by mixing a black resin of a pigment material, carbon black, titanium black, or the like into a resin material such as photosensitive or non-photosensitive polyimide. Alternatively, a light-blocking metal film can be used, which may be formed using chromium, molybdenum, nickel, titanium, cobalt, copper, tungsten, aluminum, or the like, for example.

There is no particular limitation on the method for forming the light-blocking layer, and a dry method such as an evaporation method, a sputtering method, or a CVD method or a wet method such as a spin coating method, a dipping method, a spray coating method, a droplet discharging method (e.g., an ink-jet method, screen printing, or offset printing), can be used depending on the material. As needed, an etching method (dry etching or wet etching) can be employed to form a desired pattern.

In the case where the light-blocking layer is used as part of the interlayer insulating film 413, it is preferable to use a black organic resin.

In the case where the light-blocking layer is directly formed on the substrate 315 side where the element layer 317 is provided as part of the interlayer insulating film 413, the problem of misalignment between the light-blocking layer and a pixel region does not occur, whereby the formation region can be controlled more precisely even when a pixel has a minute pattern.

The light-blocking layer provided in this manner can block light entering the semiconductor layer of the transistor; consequently, electric characteristics of the transistor can be prevented from varying due to incident light and can be stabilized. Further, the light-blocking layer prevents light leakage to an adjacent pixel, and reduces display unevenness caused by light leakage or the like due to an alignment defect of liquid crystals which occurs easily over a contact hole. As a result, high definition and high reliability of the liquid crystal display device can be achieved.

Next, a liquid crystal panel 305 of a passive matrix type, which can be easily manufactured, as compared with the liquid crystal panel 305 of an active matrix type having a switching element (a transistor) in a pixel, will be described. The liquid crystal panel 305 of a passive matrix type can be easily manufactured because a switching element (a transistor) in a pixel does not need to be provided.

Figure 7A:
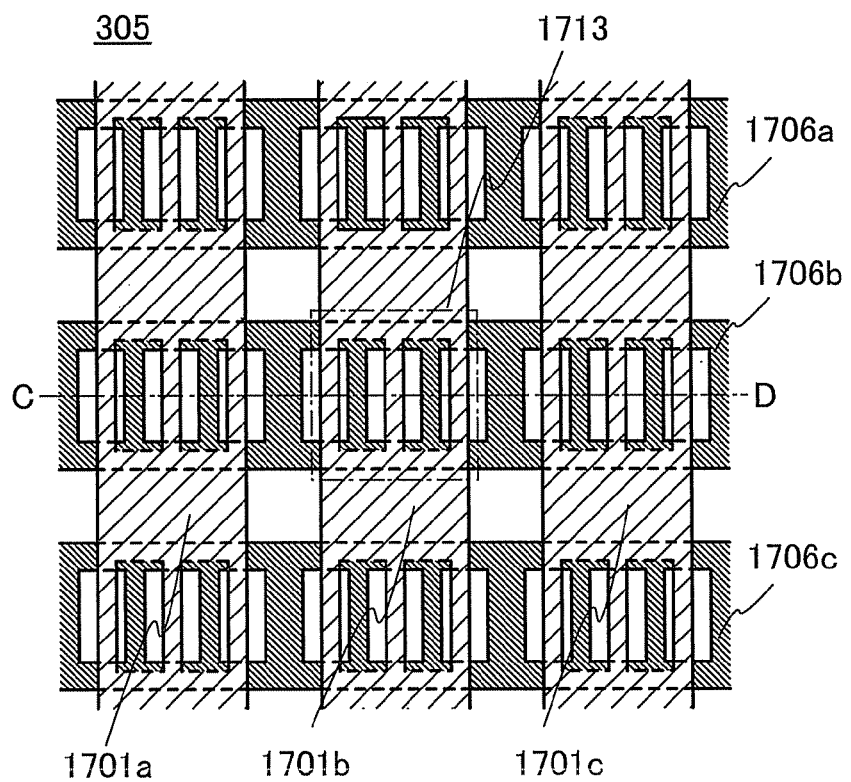
FIGS. 7A and 7B are a top view and a cross-sectional view illustrating a structure of a display device according to the present invention, respectively.
Figure 7B:
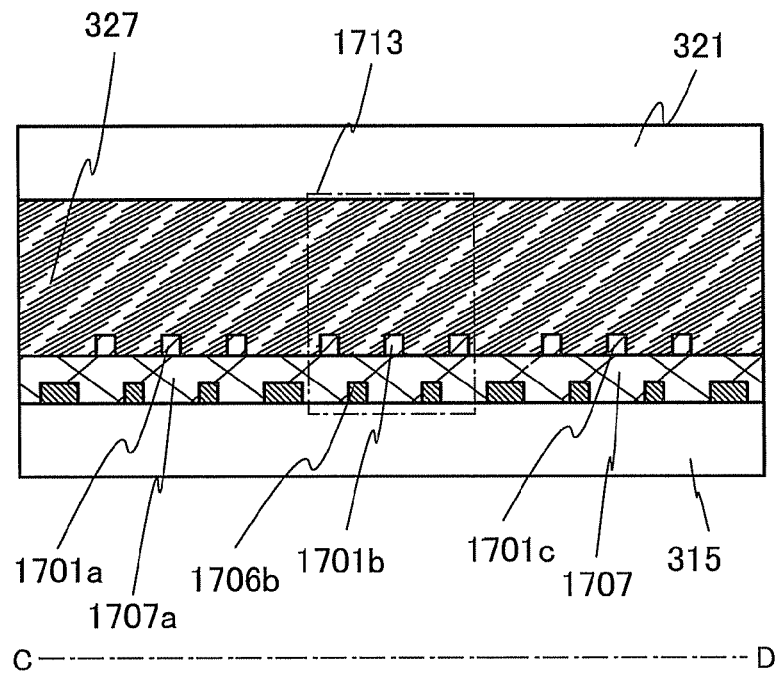

FIG. 7A is the top view of the liquid crystal panel 305 of a passive matrix type. Further, FIG. 7B is a cross-sectional view taken along a line C-D in FIG. 7A. Furthermore, in FIG. 7A, the liquid crystal 327 and the counter substrate 321 are omitted and are not illustrated; however, they are provided as shown in FIG. 7B.

Common electrodes 1706a, 1706b, and 1706c, an insulating film 1707, pixel electrodes 1701a, 1701b, and 1701c, and the liquid crystal 327 are provided between the counter substrate 321 and the substrate 315. The pixel electrodes 1701a, 1701b, and 1701c correspond to the pixel electrodes 319 of an active matrix type (see FIGS. 3A and 3B) and the common electrodes 1706a, 1706b, and 1706c correspond to the common pixel electrodes 323 of an active matrix type (see FIGS. 3A and 3B). Further, the pixel electrodes 1701a, 1701b, and 1701c are controlled by a common driver corresponding to the scan line driver circuit of an active matrix type and the common electrodes 1706a, 1706b, and 1706c are controlled by a segment driver corresponding to the signal line driver circuit of an active matrix type.

The pixel electrodes 1701a, 1701b, and 1701c and the common electrodes 1706a, 1706b, and 1706c each have a shape with an opening pattern which includes a rectangular opening (slit) in a pixel region.

With an electric field formed between the pixel electrodes 1701a, 1701b, and 1701c and the common electrodes 1706a, 1706b, and 1706c, the liquid crystal 327 is controlled. An electric field in a lateral direction is formed for the liquid crystal, so that liquid crystal molecules can be controlled using the electric field. The liquid crystal molecules can be controlled in the direction parallel to the substrate, whereby a wide viewing angle is obtained.

Further, in the liquid crystal panel 305 of a passive matrix type, monochrome display or color display using a coloring layer can be performed like the liquid crystal panel 305 of an active matrix type as described above. The color filter which is a coloring layer is described as above.

For the pixel electrodes 1701a, 1701b, and 1701c and the common electrodes 1706a, 1706b, and 1706c, the pixel electrode and the common electrode described in the pixel electrode 319 and the common pixel electrode 323 of an active matrix type can be used.

Although not shown, the spacer described above can be used for keeping the cell gap, and the sealant described above can be used for sealing the liquid crystal 327 like the liquid crystal display device of an active matrix type as describe above. Note that a light-blocking layer (a black matrix) can be also provided for the liquid crystal panel 305 of a passive matrix type.

Note that this embodiment can be implemented in free combination with any of the other embodiments.
(Embodiment 3)

In this embodiment, a display device in which the transmittance of light emitted from a backlight in each pixel is controlled using MEMS (micro electro mechanical systems) will be described with reference to FIG. 8, FIG. 9, and FIG. 10.

Figure 8:
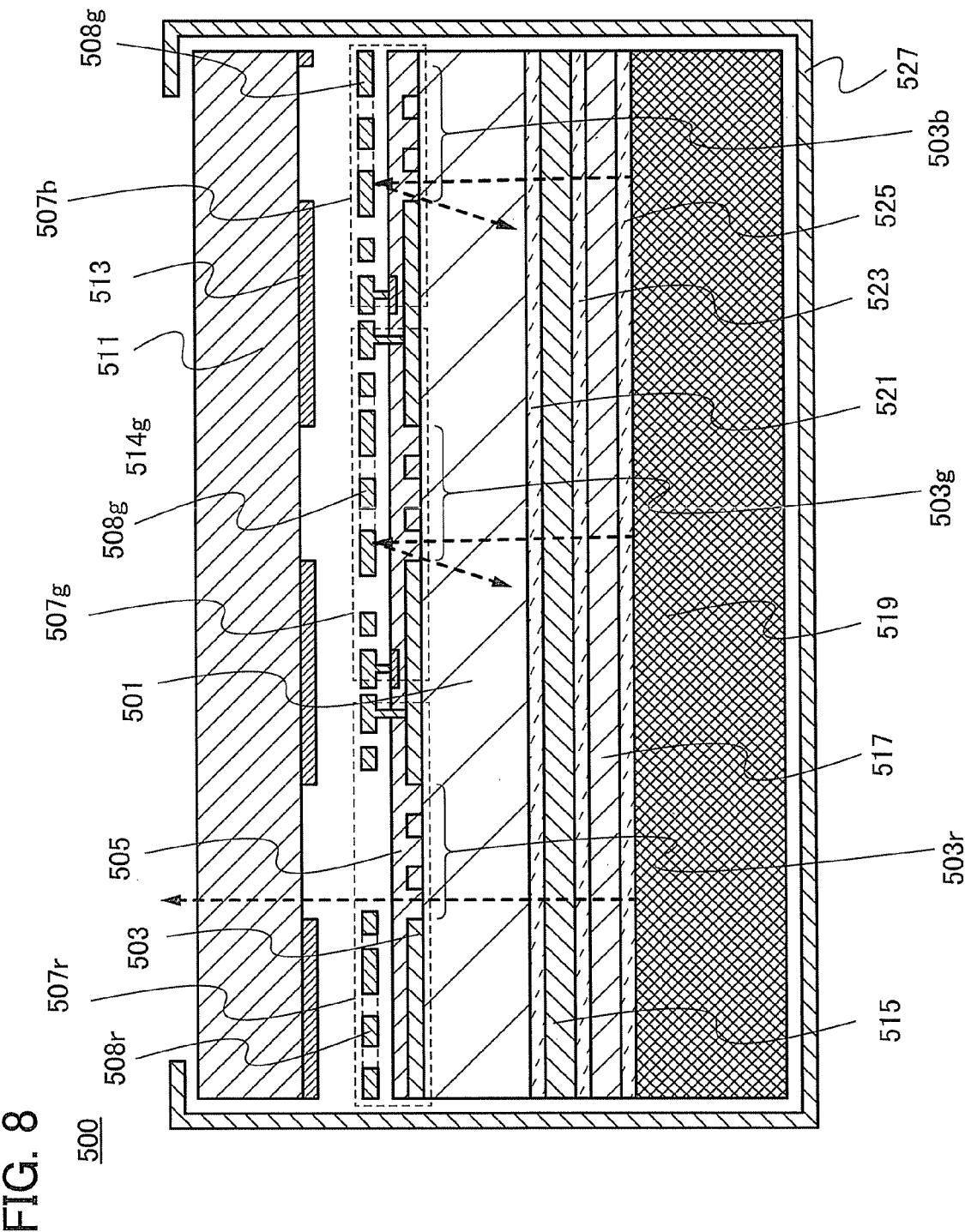
FIG. 8 is a cross-sectional view illustrating a display device according to the present invention.

FIG. 8 is a cross-sectional view of a display device 500 in which the transmittance of light emitted from a backlight in each pixel is controlled using MEMS having a three-dimensional structure, which is a partially movable microstructure.

The display device 500 includes a reflective layer 503 over a first substrate 501 and a light-transmitting insulating film 505 over the reflective layer 503. MEMS switches 507r, 507g, and 507b are provided over the light-transmitting insulating film 505. Note that although not shown, the light-transmitting insulating film 505 is formed using a plurality of insulating films and transistors which are connected to the MEMS switches 507r, 507g, and 507b are each formed between the insulating films. The transistor described in Embodiment 2 can be used as appropriate as the transistor. On a second substrate 511 opposite to the first substrate 501, a light-blocking layer 513 is formed on the position opposite to the reflective layer 503.

Further, a diffusion plate 515, a luminance enhancement sheet 517, and a backlight module 519 as a light source are provided in this order from the first substrate 501 side. The first substrate 501 and the diffusion plate 515, the diffusion plate 515 and the luminance enhancement sheet 517, and the luminance enhancement sheet 517 and the backlight module 519 are bonded together using light-transmitting adhesives 521, 523, and 525, respectively. That is, the first substrate 501, the diffusion plate 515, the luminance enhancement sheet 517, and the backlight module 519 are bonded together. Note that the luminance enhancement sheet 517 can be used as appropriate; therefore, it is possible to employ a structure where the luminance enhancement sheet 517 is not provided or a structure where the luminance enhancement sheet 517 and the diffusion plate 515 are provided in this order from the first substrate 501 side.

Further, a housing 527 formed using a metal sheet or molded plastic to cover the backlight module 519 from the second substrate 511 side is provided.

Note that as described in Embodiment 2, a structure partially bonded may be employed. That is, a structure can be employed in which the first substrate 501 side and the diffusion plate 515 are bonded to each other, and the luminance enhancement sheet 517 and the backlight module 519 are bonded to each other, but the diffusion plate 515 and the luminance enhancement sheet 517 are not bonded to each other.

An example of a display method of the display device 500 described in this embodiment is given. For example, opening portions 503g and 503b surrounded by the reflective layer 503 are covered with non-opening portions of a shutter 508g of a MEMS switch 507g and a shutter 508b of a MEMS switch 507b, whereby light emitted from the backlight module 519 is reflected at the non-opening portions of the shutter 508g and the shutter 508b, and the opening portions 503g and 503b do not transmit light emitted from the backlight module 519. Note that an opening portion 503r surrounded by the reflective layer 503 is not covered with a shutter 508r of a MEMS switch 507r and is moved over the reflective layer 503, whereby the opening portion 503r transmits light emitted from the backlight module 519.

In the display device 500 described in this embodiment, monochrome display or color display can be performed. In the case where the display device 500 performs monochrome display, white light is emitted from the backlight module 519. In the case where the display device 500 performs color display, particularly, full-color display, a coloring layer is provided to correspond to the opening portions 503r, 503g, and 503b. However, with the use of the field-sequential driving method described in the above embodiment, full-color display can be performed without the coloring layer (the color filter) and light emitted from the backlight module 519 can be effectively used.

In addition, luminance or gray scale of each pixel can be controlled in accordance with the number of opening and closing times or the duty ratio of the MEMS switch 507.

The first substrate 501 and the second substrate 511 may be similar to the substrate (the substrate 315 and the counter substrate 321) used for the liquid crystal display device described in Embodiment 2.

The reflective layer 503 is formed using aluminum, silver, molybdenum, tungsten, nickel, chromium, or the like. The thickness of the reflective layer 503 is greater than or equal to 30 nm and less than or equal to 1000 nm. The opening portion can have a rectangular shape, a circular shape, an elliptical shape, a polygonal shape, or the like. The opening portions 503r, 503g, and 503b transmit light from the backlight module 519 to the outside of the display device. Note that the reflective layer 503 reflects light which is emitted from the backlight module 519 and which the opening portions do not transmit, and reflect it again at the backlight module 519, whereby the reflected light can be used again.

The reflective layer 503 can be formed in such manner that a film is formed by a sputtering method, an evaporation method, or the like and then the film is partially etched through a photolithography step. Alternatively, the reflective layer 503 can be formed by a printing method, an ink-jet method, or the like.

The light-transmitting insulating film 505 is formed using silicon oxide, silicon nitride, silicon oxynitride, silicon nitride oxide, or the like, by a sputtering method, a CVD method, an evaporation method, or the like.

The MEMS switches 507r, 507g, and 507b have the same structure. Here, the MEMS switch 507r will be described as an example with reference to FIG. 9 and FIG. 10.

Figure 9:
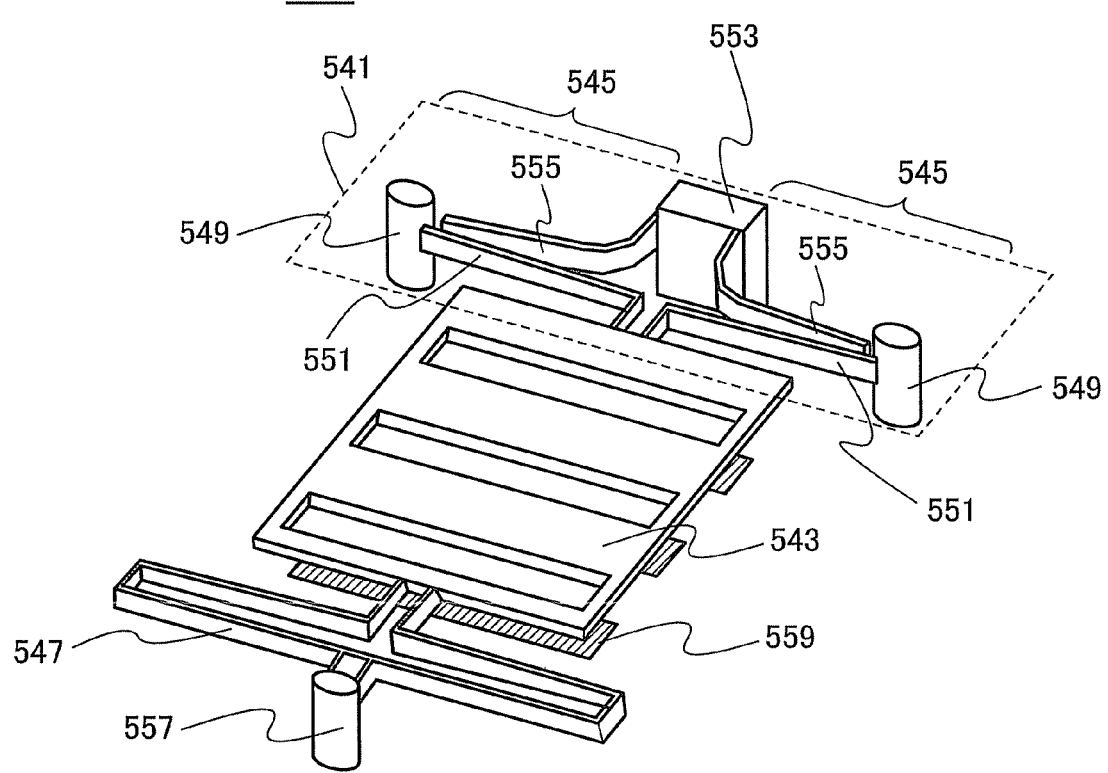
FIG. 9 is a perspective view illustrating a MEMS switch of a display device according to the present invention.

FIG. 9 is a perspective view of the MEMS switch 507. The MEMS switch 507 includes a shutter 543 combined with an actuator 541. Opening portions are provided in the shutter 543. The actuator 541 includes two flexible actuators 545. One side of the shutter 543 is connected to the actuators 545. The actuators 545 have a function of moving the shutter 543 in a lateral direction parallel to a surface of the insulating film 505.

The actuator 545 includes a movable electrode 551 which is connected to the shutter 543 and a structure body 549 and a movable electrode 555 which is connected to a structure body 553. The movable electrode 555 is adjacent to the movable electrode 551, and one terminal of the movable electrode 555 is connected to the structure body 553 and the other terminal can move freely. Further, the terminal portion of the movable electrode 555, which can move freely, is curved so as to be the closest to a connection portion of the movable electrode 551 and the structure body 549.

The other side of the shutter 543 is connected to a spring 547 having restoring force to resist force applied by the actuator 541. The spring 547 is connected to a structure body 557.

The structure bodies 549, 553, and 557 serve as mechanical supports that float the shutter 543, the actuator 545, and the spring 547 in the vicinity of a surface of the insulating film 505.

An opening portion 559 surrounded by the reflective layer is formed below the shutter 543. The opening portion 559 corresponds to the opening portions 503r, 503g, and 503b in FIG. 8.

The structure body 553 included in the MEMS switch 507 is connected to a transistor which is not illustrated. Therefore, a predetermined voltage can be applied to the movable electrode 555 which is connected to the structure body 553 through the transistor. Further, the structure bodies 549 and 557 are each connected to a ground electrode (GND) through the reflective layer 503 in FIG. 8. Therefore, the potentials of the movable electrode 551 which is connected to the structure body 549 and the spring 547 which is connected to the structure body 557 are GND. Note that the structure bodies 549 and 557 may be electrically connected to the common electrode to which a predetermined voltage can be applied.

When a voltage is applied to the movable electrode 555, the movable electrode 551 and the movable electrode 555 are electrically attracted to each other due to a potential difference generated between the movable electrode 551 and the movable electrode 555. As the result, the shutter 543 which is connected to the movable electrode 551 is attracted to the structure body 553 and is moved to the structure body 553 in a lateral direction. Since the movable electrode 551 has a function of a spring, when the voltage between the potential of the movable electrode 551 and the potential of the movable electrode 555 is removed, the movable electrode 551 releases the stress stored in the movable electrode 551 and pushes the shutter 543 back to the original position.

A method for manufacturing the MEMS switch 507 will be described below. A sacrificial layer having a predetermined shape is formed over the insulating film 505 through a photolithography step. The sacrificial layer can be formed using an organic resin such as polyimide, acrylic, or the like or an inorganic insulating film or the like such as silicon oxide, silicon nitride, silicon oxynitride, silicon nitride oxide, or the like.

Next, a conductive layer is formed over the sacrificial layer by a printing method, a sputtering method, an evaporation method, or the like, and then the conductive layer is selectively etched so that the MEMS switch 507 is formed. Alternatively, the MEMS switch 507 is formed by an ink-jet method.

Next, by removal of the sacrificial layer, the MEMS switch 507 that can move in the space can be formed. Note that, after this, it is preferable that a surface of the MEMS switch 507 be oxidized by oxygen plasma, thermal oxidation, or the like, whereby an oxide film is formed. Alternatively, it is preferable that an insulating film including alumina, silicon oxide, silicon nitride, silicon oxynitride, silicon nitride oxide, DLC (diamond like carbon), or the like be formed on a surface of the MEMS switch 507 by an atomic layer evaporation method or a CVD method. By providing the insulating film on the MEMS switch 507, deterioration with time of the MEMS switch 507 can be reduced.

The MEMS switch 507 can be Banned using a metal or an alloy such as aluminum, copper, nickel, chromium, titanium, molybdenum, tantalum, neodymium, or the like. The thickness of the MEMS switch 507 is greater than or equal to 100 nm and less than or equal to 5 μm.

The light-blocking layer 513 formed on the second substrate 5 is formed to cover the reflective layer 503.

Note that although not shown, the first substrate 501 and the second substrate 511 are fixed together using a sealant with a given distance between the substrates.

As the diffusion plate 515 and the luminance enhancement sheet 517 in FIG. 8, the diffusion plate 301 and the optical member 333 described in Embodiment 2 can be used as appropriate, respectively.

As the backlight module 519, the backlight module 100 described in Embodiment 1 can be used. With the use of the backlight module 100 described in Embodiment 1, light emitted from the light-emitting element (the light-emitting diode) included in the backlight module 519 can effectively enter the first substrate 501. Further, the display device including the MEMS switch itself has high use efficiency of light emitted from the backlight module 519; therefore, power consumption of the display device can be reduced. Thus, sufficiently high contrast can be obtained even when luminance of the light-emitting element (the light-emitting diode) is low.

Next, an equivalent circuit diagram and a driving method of the display device in this embodiment will be described with reference to FIG. 10.

Figure 10:
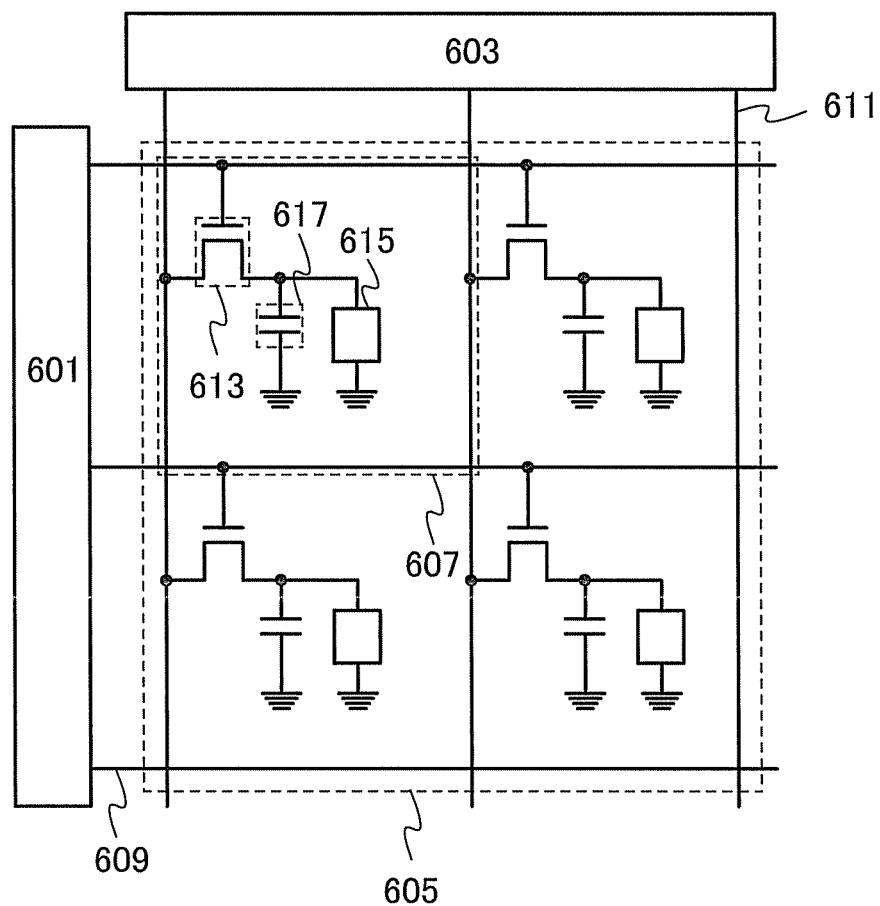
FIG. 10 is an equivalent circuit diagram illustrating a display device according to the present invention.

FIG. 10 shows an equivalent circuit diagram of the display device in this embodiment. A display device 600 includes a scan line driver circuit 601, a signal line driver circuit 603, and a pixel portion 605. The pixel portion 605 includes a scan line 609 which is connected to the scan line driver circuit 601 and a signal line 611 which is connected to the signal line driver circuit 603. By the signal line driver circuit 603, a display data signal necessary for writing is applied to the signal line 611. Further, pixels 607 are arranged in matrix in the pixel portion 605. A transistor 613 whose gate is connected to the scan line 609 and whose source electrode is connected to the signal line 611, a MEMS switch 615 whose first terminal is connected to a drain electrode of the transistor 613, and a capacitor 617 whose first electrode is connected to the drain electrode of the transistor 613 and the first terminal of the MEMS switch 615 are provided in each pixel 607. A second terminal of the MEMS switch 615 and a second electrode of the capacitor 617 are connected to a ground electrode.

The transistor 613 controls the voltage applied to the MEMS switch 615. The transistor described in Embodiment 2 can be used for the transistor 613. Alternatively, instead of a transistor, a diode or a MIM (metal insulator metal) may be used.

The MEMS switch 615 corresponds to the MEMS switch 507 in FIG. 9.

The MEMS switch 615 includes an actuator having two movable electrodes and a shutter. Note that the two movable electrodes have different capacitance.

The transistor 613 is connected to the movable electrode 555 having lower capacitance with the structure body 553 in the MEMS switch 615. The movable electrode 551 in the MEMS switch 507 is connected to the shutter 543 with a large area and thus has high capacitance and is connected to a common electrode or a ground electrode with the structure body 549. The spring 547 is connected to the common electrode or the ground electrode through the structure body 557.

Display selection signals are input to the scan line 609 one after another and the transistors 613 are sequentially turned on. Further, a display data signal is input to the selected signal line 611. A data voltage Vd corresponding to the display data signal is applied to the MEMS switch 615 which is connected to the transistor 613 in an on state and the capacitor 617. Thus, a potential difference is generated between the movable electrode 555 and the shutter 543. In accordance with generation of the potential difference, the shutter is electrically attracted to the movable electrode 555 and the shutter is moved. Further, the shutter does not overlap with an opening portion of the pixel portion and the opening portion transmits light emitted from the backlight.

In a display device of an analog driving method, a display data signal is input to each signal line 611 in accordance with desired luminance of each pixel 607. In accordance with the data voltage Vd corresponding to the display data signal, the distance which the shutter of the MEMS switch 615 moves is changed. In accordance with the distance which the shutter moves, an area where the opening portion of the pixel overlaps with the opening portion of the shutter varies or the opening portion of the pixel portion does not overlap with the shutter; therefore, the amount of light emitted from the backlight which the opening portion transmits varies.

In a display device of a digital driving method, as the data voltage Vd corresponding to the display data signal, a voltage lower than the voltage (the operation threshold voltage) at which the actuator of the MEMS switch 615 starts operating or higher than the operation threshold voltage is applied. By an application of the data voltage Vd higher than the operation threshold voltage, the shutter of the MEMS switch 615 is moved and the opening portion of the pixel transmits light emitted from the backlight module.

The voltage applied to the capacitor 617 is kept even after input of the display selection signal is stopped. The voltage of the capacitor 617 is substantially stored until the whole video frame is written or new data is written to the signal line 611. Thus, the number of times of writing can be minimized, and power consumption of the display device can be reduced.

Note that, in this embodiment, the equivalent circuit in which one transistor is connected to the MEMS switch 615 is illustrated; however, the present invention is not limited thereto, and transistors can be provided as appropriate.

The display device including the MEMS switch has high use efficiency of light emitted from the backlight; therefore, sufficiently high contrast can be obtained even when luminance of the light-emitting element (the light-emitting diode) is low and power consumption of the display device can be reduced.

(Embodiment 4)

The display device which is one embodiment of the present invention can be applied to a variety of electronic appliances. Examples of electronic appliances include a television set (also referred to as a television or a television receiver). In addition, a display device of one embodiment of the present invention can be applied to indoor digital signage, public information display (PID), advertisements in vehicles such as a train, or the like. In particular, in the display device which is one embodiment of the present invention, power consumption of the backlight (the light-emitting element) can be reduced; therefore, the use of the display device which is one embodiment of the present invention as the above electronic appliances in which an image is displayed for a long time is effective. Here, FIGS. 11A and 11B illustrate examples of electronic appliances using the display device which is one embodiment of the present invention.

Figure 11A:
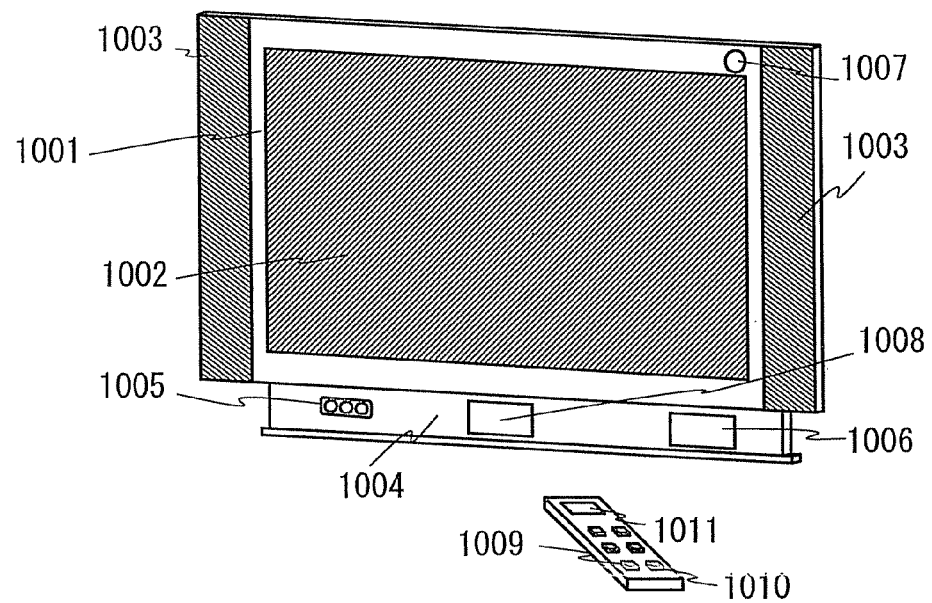
FIGS. 11A and 11B illustrate an example of a television set and an example of digital signage, respectively.
Figure 11B:
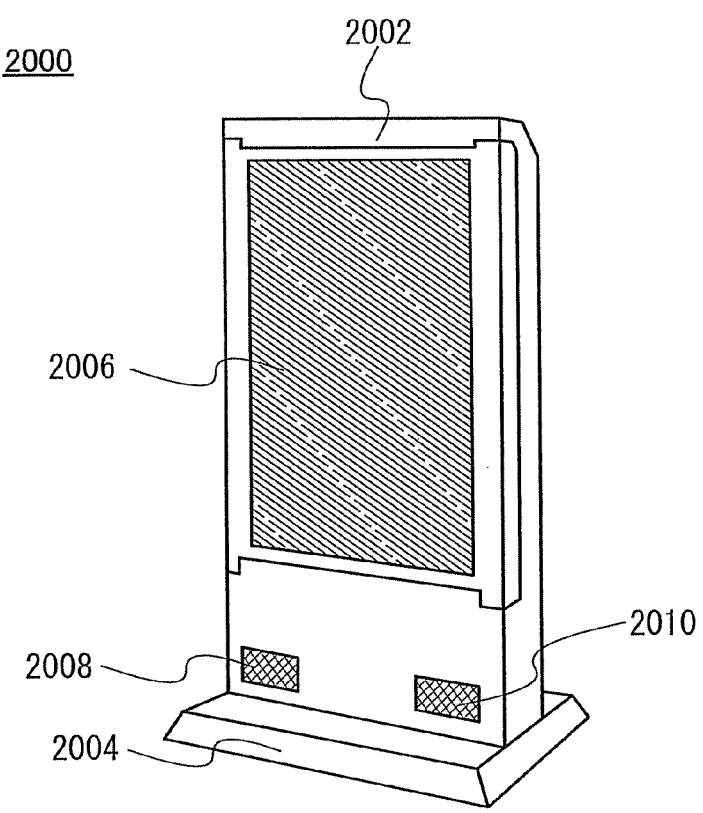

FIG. 11A illustrates an example of a television set. In a television set 1000, a display portion 1002 is incorporated in a housing 1001. Images can be displayed on the display portion 1002. In addition, here, the housing 1001 is supported by a housing 1004. Further, the television set 1000 includes a speaker 1003, operation keys 1005 (including a power switch or an operation switch), a connection terminal 1006, a sensor 1007 (a sensor having a function of measuring force, position, distance, light, magnetism, temperature, time, electric field, electric power, humidity, gradient, oscillation, or infrared ray), a microphone 1008, and the like.

The television set 1000 can be operated by an operation switch or a separate remote controller 1010. Channels and volume can be controlled with an operation key 1009 of the remote controller 1010 so that an image displayed on the display portion 1002 can be controlled. Further, the remote controller 1010 may be provided with a display portion 1011 for displaying data output from the remote controller 1010.

Note that the television set 1000 is provided with a receiver, a modem, and the like. With the receiver, general television broadcast can be received. Moreover, when the display device is connected to a communication network with or without wires via the modem, one-way (from a sender to a receiver) or two-way (between a sender and a receiver or between receivers) information communication can be performed.

FIG. 11B illustrates an example of digital signage. For example, digital signage 2000 includes two housings, a housing 2002 and a housing 2004. The housing 2002 includes a display portion 2006 and two speakers, a speaker 2008 and a speaker 2010. In addition, the digital signage 2000 may be provided with a sensor so as to operate in a following manner: an image is not displayed when a person is not close to the digital signage or the like.

The display device which is one embodiment of the present invention can be applied to the display portion 1002 of the television set 1000 and the display portion 2006 of the digital signage 2000, and power consumption of the backlight (the light-emitting element) can be reduced; thus, power consumption of the television set 1000 and the digital signage 2000 can be reduced.

Note that this embodiment can be implemented in free combination with any of the other embodiments.

This application is based on Japanese Patent Application serial no. 2010-239059 filed with Japan Patent Office on Oct. 25, 2010, the entire contents of which are hereby incorporated by reference.

What is claimed is:

1. A display device comprising:
   a backlight module in which a plurality of light-emitting elements are arranged;
   a diffusion plate which is bonded to the backlight module;
   a first polarizing plate which is bonded to the diffusion plate;
   a liquid crystal panel which is bonded to the first polarizing plate;
   a second polarizing plate which is bonded to the liquid crystal panel; and
   a wiring electrically connected to the backlight module and the liquid crystal panel,
   wherein the backlight module comprises:
      a first organic resin having a projected spherical surface and a light-transmitting property and covering each of the plurality of light-emitting elements; and
      a second organic resin having a planarized surface and a light-transmitting property and covering the plurality of light-emitting elements and the first organic resin, and
   wherein the wiring is in contact with a side surface of the second organic resin, a side surface of the diffusion plate and a side surface of the first polarizing plate.

2. The display device according to claim 1, wherein a light refractive index of the first organic resin is greater than a light refractive index of the second organic resin.

3. The display device according to claim 1, wherein the liquid crystal panel includes a coloring layer.

4. The display device according to claim 1,
   wherein the plurality of light-emitting elements comprise a light-emitting element that emits red light, a light-emitting element that emits green light, and a light-emitting element that emits blue light, and
   wherein a field-sequential method for color display is employed in which the light-emitting element that emits red light, the light-emitting element that emits green light, and the light-emitting element that emits blue light are sequentially turned on.

5. A display device comprising:
   a backlight module in which a plurality of light-emitting elements are arranged;
   a diffusion plate which is bonded to the backlight module;
   an optical member which is bonded to the diffusion plate;
   a first polarizing plate overlapping with the optical member;
   a liquid crystal panel which is bonded to the first polarizing plate;
   a second polarizing plate which is bonded to the liquid crystal panel; and
   a wiring electrically connected to the backlight module and the liquid crystal panel,
   wherein the backlight module comprises:
      a first organic resin having a projected spherical surface and a light-transmitting property and covering each of the plurality of light-emitting elements; and
      a second organic resin having a planarized surface and a light-transmitting property and covering the plurality of light-emitting elements and the first organic resin, and
   wherein the wiring is in contact with a side surface of the second organic resin, a side surface of the diffusion plate, a side surface of the optical member and a side surface of the first polarizing plate.

6. The display device according to claim 5, wherein a light refractive index of the first organic resin is greater than a light refractive index of the second organic resin.

7. The display device according to claim 5, wherein the liquid crystal panel includes a coloring layer.

8. The display device according to claim 5,
   wherein the plurality of light-emitting elements comprise a light-emitting element that emits red light, a light-emitting element that emits green light, and a light-emitting element that emits blue light, and
   wherein a field-sequential method for color display is employed in which the light-emitting element that emits red light, the light-emitting element that emits green light, and the light-emitting element that emits blue light are sequentially turned on.

9. A display device comprising:
   a backlight module in which a plurality of light-emitting elements are arranged;
   a first polarizing plate which is bonded to the backlight module;
   a liquid crystal panel which is bonded to the first polarizing plate;
   a second polarizing plate which is bonded to the liquid crystal panel; and
   a wiring electrically connected to the backlight module and the liquid crystal panel,
   wherein the backlight module comprises:
      a first organic resin having a projected spherical surface and a light-transmitting property and covering each of the plurality of light-emitting elements; and
      a second organic resin having a planarized surface and a light-transmitting property and including an object which causes scattering of light to cover the plurality of light-emitting elements and the first organic resin, and wherein the wiring is in contact with a side surface of the second organic resin and a side surface of the first polarizing plate.

10. The display device according to claim 9, wherein a light refractive index of the first organic resin is greater than a light refractive index of the second organic resin.

11. The display device according to claim 9, wherein the liquid crystal panel includes a coloring layer.

12. The display device according to claim 9, wherein the plurality of light-emitting elements comprise a light-emitting element that emits red light, a light-emitting element that emits green light, and a light-emitting element that emits blue light, and wherein a field-sequential method for color display is employed in which the light-emitting element that emits red light, the light-emitting element that emits green light, and the light-emitting element that emits blue light are sequentially turned on.

13. A display device comprising:
a backlight module in which a plurality of light-emitting elements are arranged;
an optical member which is bonded to the backlight module;
a first polarizing plate overlapping with the optical member;
a liquid crystal panel which is bonded to the first polarizing plate;
a second polarizing plate which is bonded to the liquid crystal panel; and
a wiring electrically connected to the backlight module and the liquid crystal panel,
wherein the backlight module comprises:
a first organic resin having a projected spherical surface and a light-transmitting property and covering each of the plurality of light-emitting elements; and
a second organic resin having a planarized surface and a light-transmitting property and including an object which causes scattering of light to cover the plurality of light-emitting elements and the first organic resin, and wherein the wiring is in contact with a side surface of the second organic resin, a side surface of the optical member and a side surface of the first polarizing plate.

14. The display device according to claim 13, wherein a light refractive index of the first organic resin is greater than a light refractive index of the second organic resin, and wherein the optical member is an optical member improving luminance.

15. The display device according to claim 13, wherein the liquid crystal panel includes a coloring layer.

16. The display device according to claim 13, wherein the plurality of light-emitting elements comprise a light-emitting element that emits red light, a light-emitting element that emits green light, and a light-emitting element that emits blue light, and wherein a field-sequential method for color display is employed in which the light-emitting element that emits red light, the light-emitting element that emits green light, and the light-emitting element that emits blue light are sequentially turned on.

* * * * *